United States Patent
Bevan et al.

(10) Patent No.: US 9,840,972 B2
(45) Date of Patent: Dec. 12, 2017

(54) SUPERCHARGER-BASED TWIN CHARGING SYSTEM FOR AN ENGINE

(75) Inventors: Karen Evelyn Bevan, Northville, MI (US); Douglas Anthony Hughes, Commerce Township, MI (US); Sean Keidel, Royal Oak, MI (US); Benjamin James Morris, Ann Arbor, MI (US); Jeremy Novak, Kalamazoo, MI (US); Martin Dale Pryor, Canton, MI (US); Christopher Suhocki, Belmond, IA (US); Philip William Wetzel, Battle Creek, MI (US)

(73) Assignee: Eaton Corporation, Cleveland, OH (US)

(*) Notice: Subject to any disclaimer, the term of this patent is extended or adjusted under 35 U.S.C. 154(b) by 829 days.

(21) Appl. No.: 13/481,473

(22) Filed: May 25, 2012

(65) Prior Publication Data
US 2013/0090832 A1  Apr. 11, 2013

Related U.S. Application Data

(60) Provisional application No. 61/489,861, filed on May 25, 2011, provisional application No. 61/636,626, (Continued)

(51) Int. Cl.
*F02B 33/44*  (2006.01)
*F02D 23/00*  (2006.01)
(Continued)

(52) U.S. Cl.
CPC ............ *F02D 23/005* (2013.01); *F02B 33/34* (2013.01); *F02B 37/04* (2013.01); *F02B 39/12* (2013.01);
(Continued)

(58) Field of Classification Search
CPC .......... F02B 39/12; F02B 39/16; F02B 33/38; F02B 33/34; F02B 37/16; F02B 37/04;
(Continued)

(56) References Cited

U.S. PATENT DOCUMENTS 2,703,560 A    3/1955  Lieberherr
3,822,771 A *  7/1974  Audiffred ............... F16H 47/06
                                                    192/103 F
(Continued)

FOREIGN PATENT DOCUMENTS

DE    102005010792      9/2006
DE    10 2006 058 150 A1   6/2008
(Continued)

OTHER PUBLICATIONS

Invitation to Pay Additional Fees with Partial International Search dated Sep. 26, 2012.
Controlled Power Technologies, "VTES", Copyright 2009, obtained from http://www.cpowert.com/products/vtes.htm, 2 pages.
Wager, "Does a Supercharged Engine Get Better Fuel Mileage," obtained from http://www.ehow.com/about_5397297_supercharged-engine-better-fuel-mileage.html, undated, 2 pages.
(Continued)

*Primary Examiner* — Hai Huynh
*Assistant Examiner* — Gonzalo Laguarda
(74) *Attorney, Agent, or Firm* — Merchant & Gould P.C.

(57) ABSTRACT

The present disclosure relates to dual compression engine boosting systems utilizing both a turbocharger and a supercharger and control systems relating to relative activation and deactivation of the boosting devices. Various Exhaust Gas Recirculation (EGR) configurations are also disclosed for the dual compression engine boosting systems.

27 Claims, 13 Drawing Sheets

Schematic diagram of the proposed controller.
The current controller is shown above the dotted line.
The proposed addition is shown below the dotted line.

Related U.S. Application Data filed on Apr. 20, 2012, provisional application No. 61/636,657, filed on Apr. 21, 2012.

(51) Int. Cl.

| | | |
|---|---|---|
| *F02B 37/04* | (2006.01) | |
| *F02B 39/12* | (2006.01) | |
| *F02D 41/00* | (2006.01) | |
| *F02B 33/34* | (2006.01) | |
| *F02B 39/16* | (2006.01) | |
| *F02M 26/08* | (2016.01) | |
| *F02D 41/02* | (2006.01) | |

(52) U.S. Cl.
CPC .......... *F02B 39/16* (2013.01); *F02D 41/0007* (2013.01); *F02M 26/08* (2016.02); *F02D 41/023* (2013.01); *Y02T 10/144* (2013.01)

(58) Field of Classification Search
CPC .. Y02T 10/144; F02D 41/0007; F02D 23/005
USPC ........ 701/102; 123/559.1; 60/598, 600, 602, 60/611
See application file for complete search history.

(56) References Cited

U.S. PATENT DOCUMENTS

| | | | |
|---|---|---|---|
| 4,285,200 A | 8/1981 | Byrne et al. | |
| 4,364,364 A | 12/1982 | Subramaniam | |
| 4,485,793 A | 12/1984 | Oguma | |
| 4,505,117 A | 3/1985 | Matsuoka | |
| 4,589,302 A | 5/1986 | Oda et al. | |
| 4,596,225 A * | 6/1986 | Oonaka et al. ............ | 123/559.3 |
| 4,603,674 A | 8/1986 | Tanaka | |
| 4,622,939 A | 11/1986 | Matekunas | |
| 4,656,992 A | 4/1987 | Oonaka et al. | |
| 4,660,526 A * | 4/1987 | Horii .......................... | 123/559.3 |
| 4,730,457 A | 3/1988 | Yamada et al. | |
| 4,769,995 A | 9/1988 | Servé et al. | |
| 4,849,897 A | 7/1989 | Ciccarone | |
| 4,873,961 A | 10/1989 | Tanaka | |
| 4,928,653 A | 5/1990 | Ohkubo et al. | |
| 5,067,460 A | 11/1991 | Van Duyne | |
| 5,069,185 A | 12/1991 | Evasick | |
| 5,115,788 A | 5/1992 | Sasaki et al. | |
| 5,123,391 A | 6/1992 | Ohkubo et al. | |
| 5,133,188 A | 7/1992 | Okada | |
| 5,150,694 A | 9/1992 | Currie et al. | |
| 5,157,924 A | 10/1992 | Sudmanns | |
| 5,335,500 A | 8/1994 | Wunderlich et al. | |
| 5,375,577 A | 12/1994 | Betts, Jr. et al. | |
| 5,415,147 A | 5/1995 | Nagle et al. | |
| 5,454,360 A | 10/1995 | Shimizu et al. | |
| 5,458,102 A | 10/1995 | Tomisawa et al. | |
| 5,937,832 A | 8/1999 | Kapich | |
| 6,033,342 A * | 3/2000 | Steinel .................. | B60W 10/02 477/175 |
| 6,058,348 A | 5/2000 | Ohyama et al. | |
| 6,077,041 A * | 6/2000 | Carter, Jr. ............... | B64D 35/00 244/17.19 |
| 6,273,076 B1 | 8/2001 | Beck et al. | |
| 6,343,473 B1 | 2/2002 | Kanesaka | |
| 6,907,867 B2 | 6/2005 | Igarashi et al. | |
| 7,000,601 B2 | 2/2006 | Yasui et al. | |
| 7,110,876 B2 | 9/2006 | Uchiyama et al. | |
| 7,275,374 B2 | 10/2007 | Stewart et al. | |
| 7,281,518 B1 | 10/2007 | Allain et al. | |
| 7,484,368 B2 | 2/2009 | Jorgensen | |
| 7,488,164 B2 | 2/2009 | Swartzlander | |
| 7,490,594 B2 | 2/2009 | Van Dyne et al. | |
| 7,540,148 B2 | 6/2009 | Wild et al. | |
| 7,621,263 B2 | 11/2009 | Eybergen et al. | |
| 8,141,361 B2 | 3/2012 | Andersen | |
| 2006/0064981 A1 * | 3/2006 | Kojima et al. ................. | 60/612 |
| 2008/0034751 A1 * | 2/2008 | Jorgensen ...................... | 60/599 |
| 2009/0139230 A1 | 6/2009 | Baldwin et al. | |
| 2010/0132355 A1 | 6/2010 | Michels et al. | |
| 2010/0155157 A1 | 6/2010 | Grieve | |
| 2011/0067395 A1 * | 3/2011 | Suhocki .......................... | 60/602 |
| 2011/0094480 A1 * | 4/2011 | Suhocki et al. .............. | 123/564 |
| 2013/0047604 A1 * | 2/2013 | Andrasko et al. .............. | 60/600 |
| 2014/0208745 A1 * | 7/2014 | Suhocki et al. ................ | 60/611 |

FOREIGN PATENT DOCUMENTS

| | | |
|---|---|---|
| EP | 1279813 | 1/2003 |
| EP | 1314884 | 5/2003 |
| EP | 1489289 | 12/2004 |
| EP | 1992808 | 11/2008 |
| JP | 61-101622 | 5/1986 |
| JP | 63109233 | 5/1988 |
| JP | 63129123 | 6/1988 |
| JP | 02125930 | 5/1990 |
| JP | 03225031 | 10/1991 |
| JP | 11-82085 | 3/1999 |
| JP | 11324692 | 11/1999 |
| JP | 2001115847 | 4/2001 |
| JP | 2005188318 | 7/2005 |
| WO | WO 92/04536 | 3/1992 |
| WO | WO 96/30635 | 10/1996 |
| WO | WO 2004/072449 | 8/2004 |
| WO | WO 2006/066739 | 6/2006 |
| WO | WO 2007/083131 A1 | 7/2007 |
| WO | WO 2008/017952 | 2/2008 |
| WO | WO 2008/020184 | 2/2008 |
| WO | WO 2013/148205 | 10/2013 |

OTHER PUBLICATIONS

Vijayenthiran, "Electric Supercharger Offers Diesel Efficiency for Gasoline Engines," obtained from http://www.motorauthority.com/news/1024655_electric-supercharger-offers-diesel-efficiency-for-gasoline-engines, Sep. 22, 2009, 2 pages.
First page of Google™ search results for "supercharger bypass valve," obtained from http://www.google.com/#q=supercharger+bypass+valve&hl=en&prmd=imvns&source=univ&tbm=shop&tbo=u&sa=X&ei=jY2PT6PXLdSJ0QGsqvysBQ&ved=0CEcQrQQ&bav=on.2,or.r_gc.r_pw.r_qf.,cf.osb&fp=f3793bcf9ecffb4a, May 29, 2015, 1 page.
Product Information Sheet for Lancia Delta S4, obtained from http://www.uniquecarsandparts.com.au/car_info_lancia_delta_s4.htm, undated, 1 page.
"Nissan 350Z Ogura Raching Clutch Twin-Charged", Turbo Magazine, Nov. 30, 2006, obtained from http://www.turbomagazine.com/features/0701_turp_nissan_350z_twin_charged/index.html, , 4 pages.
"Twincharged: Combining turbocharger and supercharger performance," obtained from http://horsepowercalculators.net/tuner_report/twin-charging-combining-turbocharger-and-supercharger-performance, 4 pages.
"Twin-Charging and Compound Turbo Charging," obtained from http://mv350z.com/forum/forced-induction/460903-twin-charging-and-compound-turbo-charging.html, Oct. 17, 2009, 2 pages.
Wikipedia definition of "Turbocharger," obtained from http://en.wikipedia.org/wiki/Turbocharger, May 29, 2015, 12 pages.
Wikipedia definition of "Twincharger," obtained from http://en.wikipedia.org/wiki/Twincharger, May 29, 2015, 4 pages.
Bennett, "Chapter 13: Engine Retarders," *Medium/Heavy Duty Truck Engines, Fuel & Computerized Management Systems*, Delmar, Cengage Learning, Copyright 2009, cover page, table of contents, pp. 237-250 (23 pages total).
International Search Report and Written Opinion for PCT/US2012/039625 dated Sep. 24, 2013.

\* cited by examiner

VGT with HPL EGR

Super-Turbo

Turbo-Super

Block Diagram showing the control method to balance supercharger clutch life and vehicle performance. The optional Control to Minimize Driver Perception is also shown.

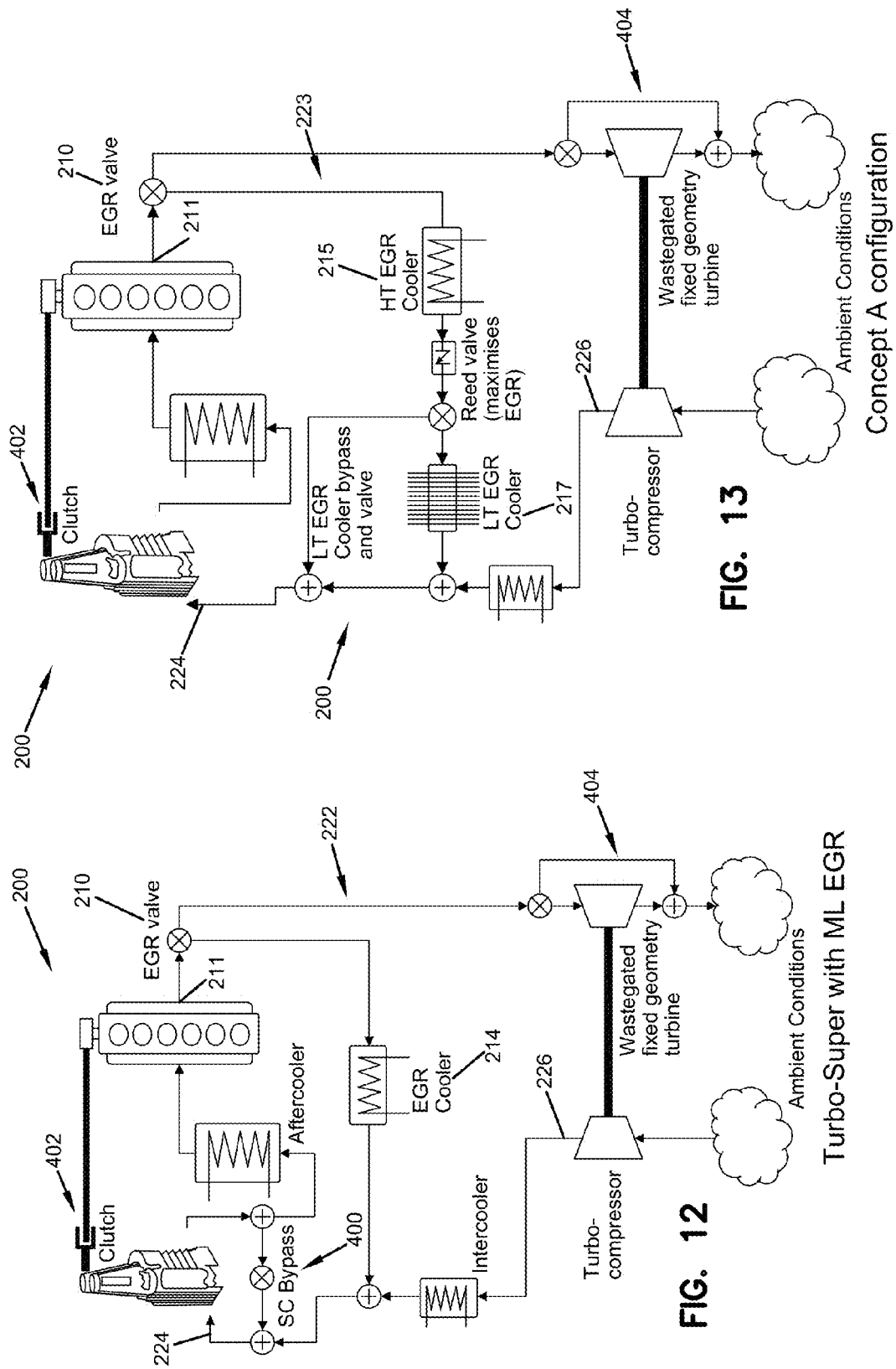

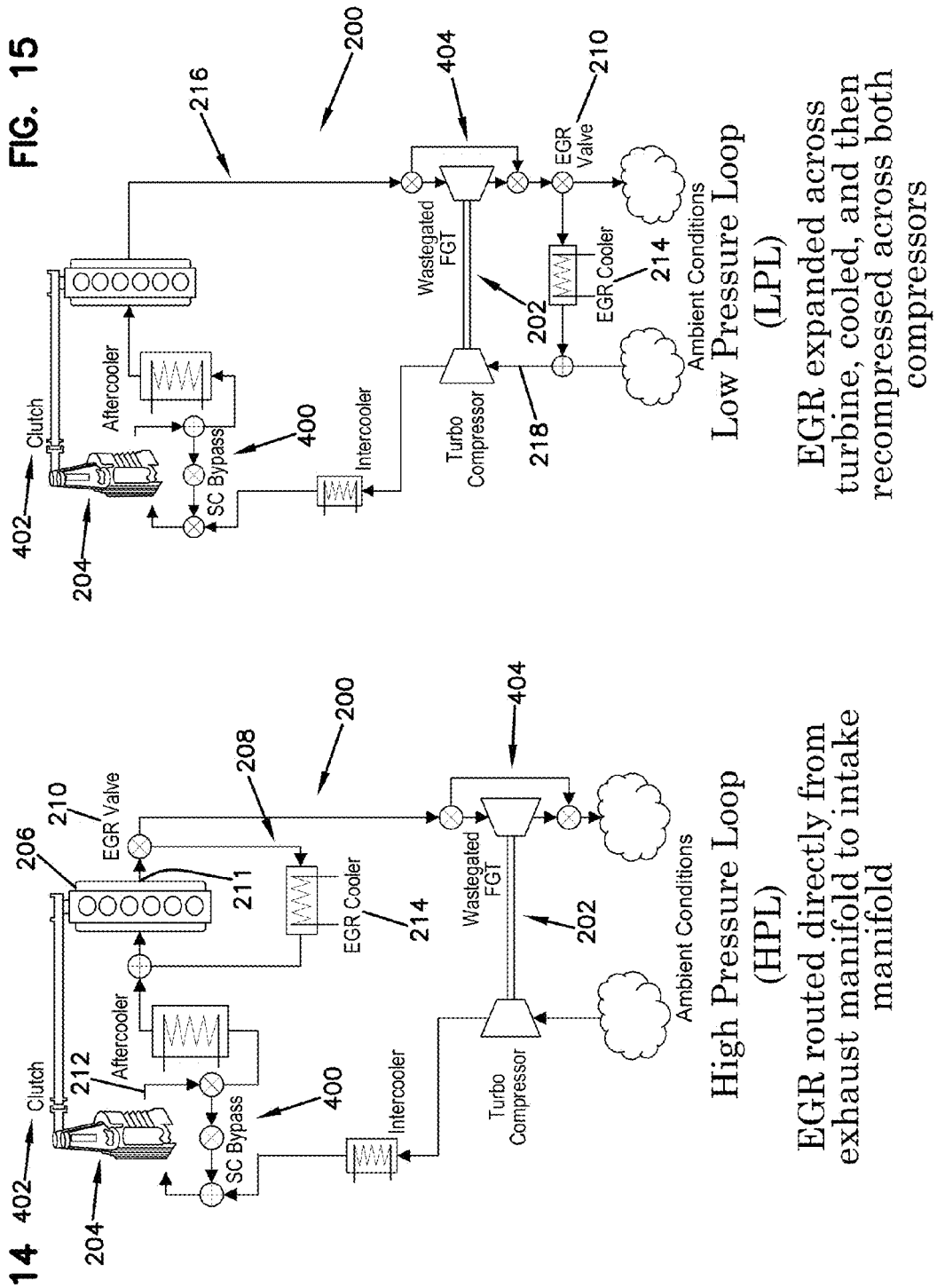

SUPERCHARGER-BASED TWIN CHARGING SYSTEM FOR AN ENGINE

CROSS REFERENCE TO RELATED APPLICATIONS

This application claims the benefit of U.S. Provisional Patent Application Ser. Nos. 61/489,861, filed May 25, 2011, 61/636,626, filed Apr. 20, 2012, and 61/636,657, filed Apr. 21, 2012, which applications are hereby incorporated by reference in their entireties.

TECHNICAL FIELD

The present disclosure relates generally to compression based engine boosting systems. More particularly, the present disclosure relates to a dual compression engine boosting system utilizing both a turbocharger and a supercharger.

BACKGROUND

In order to improve power density, a majority of diesel engines have intake manifold pressures above atmospheric conditions. This allows for the introduction of more fuel, which results in more power. It is common for diesel engines to receive charged air from a turbocharger (e.g., a Fixed Geometry Turbocharger "FGT", a Variable Geometry Turbocharger "VGT" or a combination system including both). A turbocharger develops boost by converting exhaust gas energy into power, which is used to compress the intake charge. The primary advantage of using a turbocharger is its ability to harness waste heat from the engine. This advantage brings with it the disadvantage of increased backpressure on the engine and lower quality heat for exhaust aftertreatment devices. A turbocharged engine may also have a significant performance disadvantage as well. Since turbochargers rely on exhaust gas energy, turbochargers tend to struggle to produce adequate levels of boost at lower engine speeds. A transient load step, especially when starting from a relatively low engine speed, can result in a delayed response from the engine, a phenomenon called "lag". With a turbocharger, the exhaust enthalpy content can be too low at low load conditions to drive the turbocharger and under these conditions, when the accelerator pedal is depressed, the vehicle may respond slowly due to the turbocharger "lag" as the turbocharger accelerates up to speed. The industry has tried different approaches to adapt to the turbocharger lag experiences during a transient acceleration event. One common approach to improve transient performance at low engine speeds has been the use of a smaller turbocharger turbine with less inertia. The improved transient performance, however, normally comes at the expense of poorer fuel efficiency at high speeds since the smaller turbine can cause higher exhaust restriction. Another solution that has been proposed that may provide similar engine performance is supercharging.

Superchargers, in contrast to turbochargers, use energy from the engine crankshaft. Unlike a turbocharger, which relies on exhaust gas energy to create boost, a supercharger is directly coupled to the engine. Therefore, the supercharger speed increases proportionally with engine speed. This greatly reduces the lag that may be present in a turbocharged engine, dramatically improving low speed engine response. Thus, superchargers can provide air-on-demand for effective air-fuel ratio control. The ability to maintain high air-fuel ratios during transient loads leads to superior transient performance since more fuel can be injected to produce more power with reduced smog production. For example, a supercharger such as the TVS® system manufactured by Eaton Corporation is a positive displacement pump that has shown significantly improved efficiencies over prior models. However, no matter how efficient, the advantages from a supercharger typically come at the cost of slightly higher fuel consumption versus a comparably-sized turbocharger. The higher fuel consumption is normally attributable to mechanical losses characteristic of a supercharger and its inability to recover waste heat energy.

The light, medium, and heavy-duty engine markets have both stringent regulatory targets and customer demand for improved fuel efficiency. Two approaches that may be used to meet fuel efficiency targets are engine downspeeding and downsizing.

What is needed is an engine boosting system that combines the benefits of a supercharger with those of a turbocharger, to meet the fuel efficiency targets, while maintaining or improving vehicle performance over a baseline single charging system or a twin turbo system.

SUMMARY

According to one aspect of the disclosure, an engine (e.g., a heavy duty, on-highway or off-highway diesel engine) having a twin charging system, with air at ambient atmospheric pressure being compressed by a turbocharger and then further compressed by a supercharger is disclosed herein. The turbocharger includes a turbine driven by engine exhaust gases. The supercharger may be clutched to the engine crankshaft through a drive belt and a pulley. The addition of the supercharger may improve the rate at which torque and power are produced (relative to a baseline turbo-only system) across the entire engine speed range from the increased volume of air, enabling the operation of the engine at lower average rotational speeds.

According to another aspect of the disclosure, rather than utilizing a supercharger downstream from the turbocharger, the relative locations of these components can be changed and the turbocharger may be located downstream from the supercharger to provide the twin charging system. A system that provides the inlet-supercharger-turbocharger-engine configuration path may be characterized as a super-turbo system and a system that provides the inlet-turbocharger-supercharger-engine configuration path may be characterized as a turbo-super system.

A turbo-super system, overall, may provide an equivalent amount of boost with a smaller supercharger as compared to a super-turbo system. The smaller supercharger may require less power to operate, providing the potential for further efficiency. A turbo-super system may also have potential acoustic benefits because the turbocharger can decrease supercharger inlet air pulsation noise.

According to another aspect of the disclosure, a bypass pipe incorporating a bypass valve may be disposed between the supercharger's inlet pipe and outlet pipe. In operation, the bypass valve is closed when the turbocharger is not able to provide adequate boost, for example in low speed and transient conditions, for activating the supercharger to charge the air coming from the turbocharger's compressor. According to certain control strategies utilized with the twin charging systems of the present disclosure, the bypass valve may be opened, and the supercharger clutch disengaged when the turbocharger is providing adequate boost on its own.

According to present disclosure, the twin charging system may likely benefit from operating the supercharger in order to compensate for turbo lag when a significant increase in load, regardless of engine rpm, such as may be expected at vehicle launch, low vehicle speeds, and certain transient operating modes, is encountered. When not required, losses from supercharger pumping may be reduced by having air bypass the supercharger so as to not be further compressed by the supercharger. Or, when not required, losses from the supercharger may further be reduced by having the supercharger's drive pulley clutched such that the supercharger is no longer a drag on the system.

According to the present disclosure, a relationship between the disengagement of the supercharger and the engagement of the turbocharger may be established. For example, the supercharger bypass valve may be opened (deactivating the supercharger's ability to compress the air) while the turbocharger waste gate valve is closed (activating the turbocharger). If a VGT is utilized rather than an FGT, the geometry of the turbine housing of the VGT may be altered to increase the involvement of the turbocharger in the twin charging system. A turbocharger waste gate valve, when open, normally permits exhaust to move around the turbocharger turbine, instead of through it, effectively deactivating the turbocharger from the system.

According to the present disclosure, when the bypass valve for the supercharger is opened and boost is required by the engine, the turbocharger waste gate valve may remain closed, with the turbocharger providing the boost. When the turbocharger waste gate valve remains closed, the benefit of the exhaust stream energy may be obtained in compressing air for the engine intake.

The supercharger bypass valve may be completely open when supercharger boost is not needed. However, as noted above, there may still be losses associated with spinning the supercharger even when the bypass valve is completely open. To address this, according to the present disclosure, a supercharger clutch may be employed to disengage the supercharger from the drive mechanism when boost from the supercharger is not required.

According to yet a further aspect of the disclosure, a method of control for minimizing driver perception of supercharger clutch actuation is also disclosed.

According to yet a further aspect of the disclosure, a method of control to balance supercharger clutch life and overall vehicle performance is disclosed.

According to yet another aspect of the disclosure, a method of actuating the bypass valve of the supercharger to limit supercharger belt slip is also disclosed.

According to another aspect of the disclosure, the twin charging systems (e.g., either the turbo-super system or the super-turbo system) may be compatible and used with various Exhaust Gas Recirculation (EGR) configurations for further fuel-saving strategies. At least three possible EGR system configurations may be utilized with the twin charging systems of the present disclosure.

According to one of the EGR configurations (e.g., for a turbo-super system), a high pressure loop (HPL) may be provided in which the EGR system has an EGR valve disposed in the exhaust system downstream of the exhaust ports and parallel to the turbocharger turbine and a connection point feeding the recirculated exhaust into the supercharger outlet pipe between the supercharger and the engine. The HPL may utilize an EGR cooler in the path of the exhaust gas between the valve and the connection to the fully pressurized air side.

According to a second of the EGR configurations (e.g., for a turbo-super system), a mid pressure loop (MPL) may be provided in which the EGR system has an EGR valve disposed in the exhaust system downstream of the exhaust ports and parallel to the turbocharger turbine and a connection point feeding the recirculated exhaust into the supercharger inlet pipe between the turbocharger compressor outlet and the supercharger inlet. The MPL may also utilize an EGR cooler in the path of the exhaust gas between the valve and the connection to the partially pressurized air side.

According to a third of the EGR configurations (e.g., for a turbo-super system), a low pressure loop (LPL) may be provided in which the EGR system has an EGR valve disposed in the exhaust system after the turbocharger turbine and a connection point feeding the recirculated exhaust into the turbocharger compressor inlet side. The LPL may also be provided with an EGR cooler in the path of the exhaust gas between the valve and the connection to the unpressurized inlet to the turbocharger compressor. In an LPL configuration, the exhaust gas from the turbocharger turbine may pass through a diesel particulate filter (DPF) before being placed in the path of air entering the turbocharger compressor.

According to the present disclosure, EGR system configurations for a super-turbo system layout may be similar to those discussed above with respect to the turbo-super system. For a super-turbo layout, an MPL configuration may require the exhaust to be treated by a DPF before being introduced to the turbocharger compressor air inlet stream as certain types of superchargers may be relatively more resistant to the effects of direct exhaust than turbochargers.

According to another aspect of the disclosure, driveline gearing may be provided to enable a vehicle having a twin-charged engine to reap the fuel economy benefits from the ability to downspeed the engine. Based on the operational characteristics of an added supercharger, since an engine can rotate at a lower speed for a given road speed, the engine may experience decreased frictional losses and decreased pumping losses, while the engine brake thermal efficiency may increase.

According to a further aspect of the disclosure, a twin charging system such as a turbo-super system can also be beneficially employed to provide an engine braking function. If pressurized air and no fuel is supplied to all or selected engine cylinders, engine braking may be provided by charging devices of the systems. For example, engaging the supercharger clutch and closing the bypass valve to pressurize the air may add to the torque demand on the engine. Additional braking may result from the engine pistons compressing the already boosted air. With no ignition in the cylinder, the additional force required to stroke the piston against the pre-compressed air further increases the engine braking effect. Additional braking force can be obtained by introducing EGR flow into, for example, the supercharger inlet. An exhaust brake valve can also significantly increase engine back pressure against which the pistons must pump and can be used in combination with an EGR fed supercharger based system. The combination of an EGR fed supercharger and an exhaust brake valve can approach engine braking performance available from known brake systems such as a Jacobs Compression Release Brake.

According to yet a further aspect of the disclosure, the twin charging systems of the disclosure such as a turbo-super system may provide improved thermal management of exhaust aftertreatment devices relative to a baseline single charging system or to a twin turbo system (e.g., a combination VGT and FGT system). Improved passive DPF regeneration and quicker catalyst light-off may be provided by higher exhaust gas temperatures caused by the twin charging. Since a single turbocharger is used in a twin charging system utilizing a supercharger, less energy may be extracted from the exhaust gases by the single turbo which may allow for extended periods between regenerations. A supercharger may deliver Selective Catalytic Reduction (SCR) aftertreatment temperature management by enabling the turbocharger to be bypassed (via the wastegate) while the supercharger provides boost, so exhaust heat goes to the SCR system rather than the turbocharger.

During certain load conditions such as at vehicle launch, low vehicle speeds, and certain transient operating modes, when a supercharger of the twin charging system is operational, the air-fuel ratios may be maintained leading to reduced smog production. During such transient load conditions, when the supercharger is operational, the EGR system may continue to be used, reducing the overall $NO_x$ produced by the system.

Two main design architecture based approaches may be taken in thermal management of exhaust aftertreatment systems. According to one example approach, exhaust temperatures may be kept high enough to eliminate the use of an EGR loop and by improving the efficiency of aftertreatment devices such as selective catalytic reduction (SCR) devices, as mentioned previously. According to another approach, higher EGR rates may be used on the engine compared to lower EGR rates achievable with a turbocharged engine, pushing $NO_x$ levels lower and eliminating or limiting the need for devices such as SCR and maintain good transient response.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 12 is a schematic illustrating a turbo-super engine boost system having features that are examples of inventive aspects in accordance with the present disclosure, the system shown with a mid pressure EGR loop;

FIG. 13 is a schematic illustrating a variation of the turbo-super engine boost system with the mid pressure EGR loop of FIG. 12, wherein the EGR loop includes a High Temperature EGR Cooler as well as a Low Temperature EGR Cooler;

FIG. 14 is a schematic illustrating a turbo-super engine boost system having features that are examples of inventive aspects in accordance with the present disclosure, the system shown with a high pressure EGR loop;

FIG. 15 is a schematic illustrating a turbo-super engine boost system having features that are examples of inventive aspects in accordance with the present disclosure, the system shown with a low pressure EGR loop.

DETAILED DESCRIPTION

Traditional turbocharger-only based engine boosting systems may include a Fixed Geometry Turbocharger, a Variable Geometry Turbocharger (e.g., an electronic VGT "eVGT" or a VGT), or a twin-turbo system including an electronic Variable Geometry Turbocharger in combination with a Fixed Geometry Turbocharger, as known in the art. Traditional Exhaust Gas Recirculation configurations used with turbocharger-only type boosting systems tend to be high pressure loop, low pressure loop, or both.

Figure 1A:
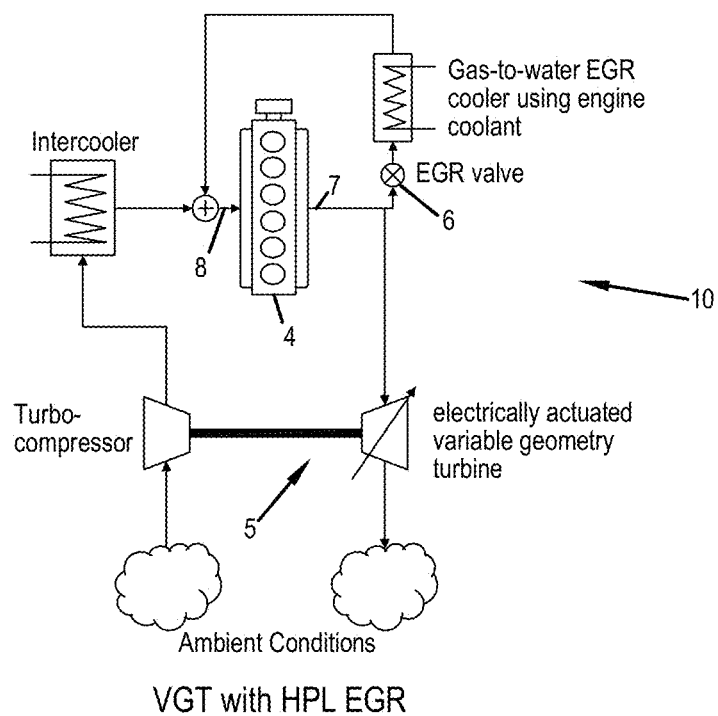
FIG. 1A is a schematic illustrating a conventional single variable geometry turbocharged system, the system also including a high pressure EGR loop.

FIG. 1A schematically illustrates a conventional single charged boosting system 10 for an engine 4 (e.g., a heavy duty diesel engine). The single charged system 10 shown in FIG. 1A includes a VGT 5 for providing the compression boost for the engine 4. In the system 10 illustrated in FIG. 1A, an EGR valve 6 downstream of the exhaust ports 7 is used for feeding recirculated exhaust into the pressurized air intake side 8 of the engine 4 to form a high pressure loop EGR configuration.

Figure 1B:
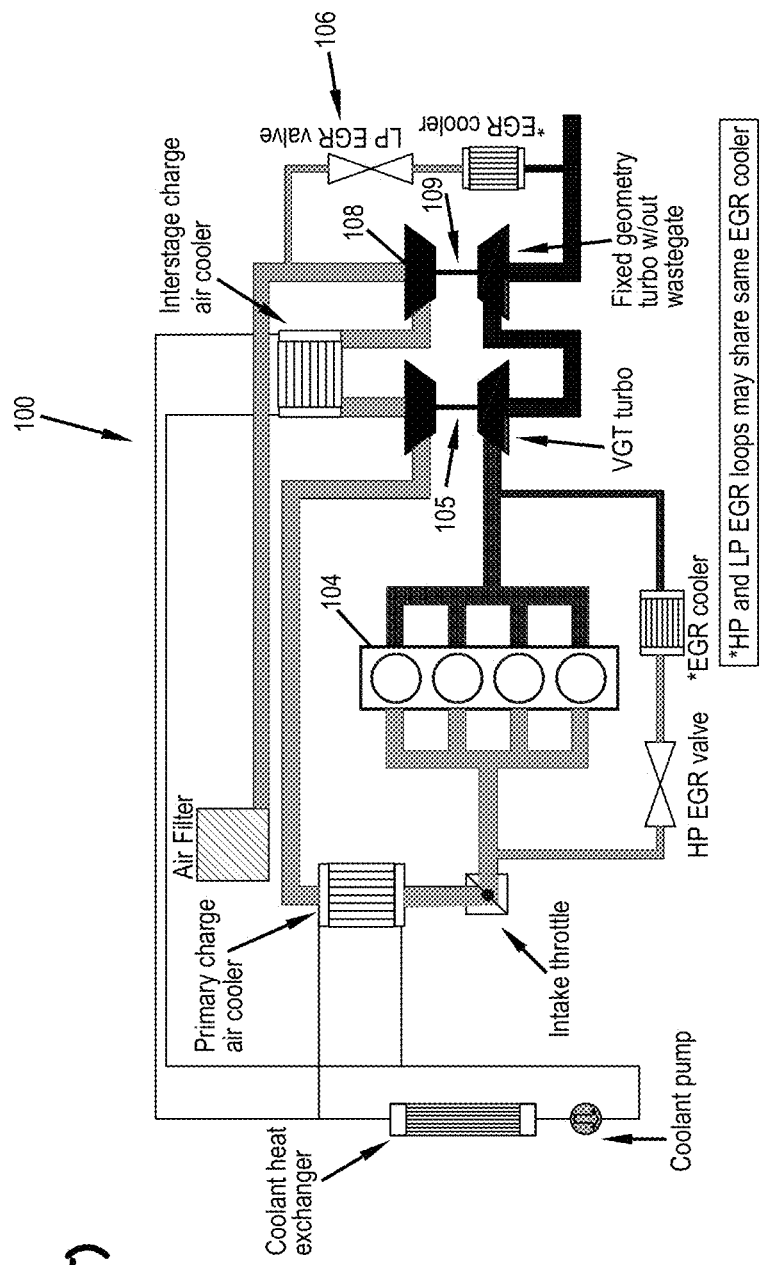
FIG. 1B is a schematic illustrating a conventional twin turbo system, the system shown with high and low pressure loop EGR capability.

FIG. 1B schematically illustrates a conventional twin turbocharged boosting system 100 for an engine 104. The twin turbo system 100 illustrated in FIG. 1B utilizes a Variable Geometry Turbocharger 105 in combination with a Fixed Geometry Turbocharger 109 to provide the boost charge for the engine 104. In the system 100 illustrated in FIG. 1B, the FGT 109 provides the primary lower pressure charge, which is then further compressed by the VGT 105 to provide a dual charged system. The system 100 of FIG. 1B is illustrated with both a high pressure loop EGR capability and a low pressure loop EGR capability. In an LPL EGR configuration, a low pressure EGR valve 106 recirculates exhaust gas into the FGT compressor inlet side 108 to provide supplemental EGR in any combination split between the two loops.

Whether a single turbocharged system 10 as shown in FIG. 1A or a twin turbocharged system 100 as shown in FIG. 1B, turbocharger-only systems bring the disadvantage of increased backpressure on an engine and lower quality heat for exhaust aftertreatment devices. Also, from a performance standpoint, since turbochargers rely on exhaust gas energy, turbochargers may struggle to produce adequate levels of boost at lower engine speeds. A transient load step, especially when starting from a relatively low engine speed, can result in a delayed response from the engine, a phenomenon called "lag" as discussed above. With a turbocharger, the exhaust enthalpy content can be too low at low load conditions to drive the turbocharger and under these conditions, when the accelerator pedal is depressed, the vehicle may respond slowly due to the turbocharger "lag" as the turbocharger accelerates up to speed. The industry has responded to such drawbacks by the use of smaller turbocharging turbines with less inertia. The improved transient performance, however, normally comes at the expense of poorer fuel efficiency at high speeds since the smaller turbocharging turbines cause higher exhaust restriction. Thus, to improve transient performance with a turbocharger, downsizing the turbocharger for low engine speeds is normally at the expense of high fuel consumption at high speeds.

In contrast to turbochargers, superchargers use energy from the engine crankshaft. Thus, the amount of boost a supercharger can provide is independent of the exhaust gas enthalpy content. A supercharger's ability to provide air-on-demand can significantly increase engine performance, especially during transient conditions. A highly efficient supercharger can maintain nearly constant air-fuel ratio and EGR flow, during transient conditions, resulting in high engine performance with reduced particulate and NO emissions. Supercharger based systems provide higher available boost at lower engine speeds versus turbocharger based systems and involve lower pumping losses. Superchargers also provide for better EGR tolerance. However, the advantages from a supercharger typically come at the cost of slightly higher fuel consumption versus a comparably-sized turbocharger due to the mechanical losses of the supercharger and its inability to recover waste heat energy.

Figure 3:
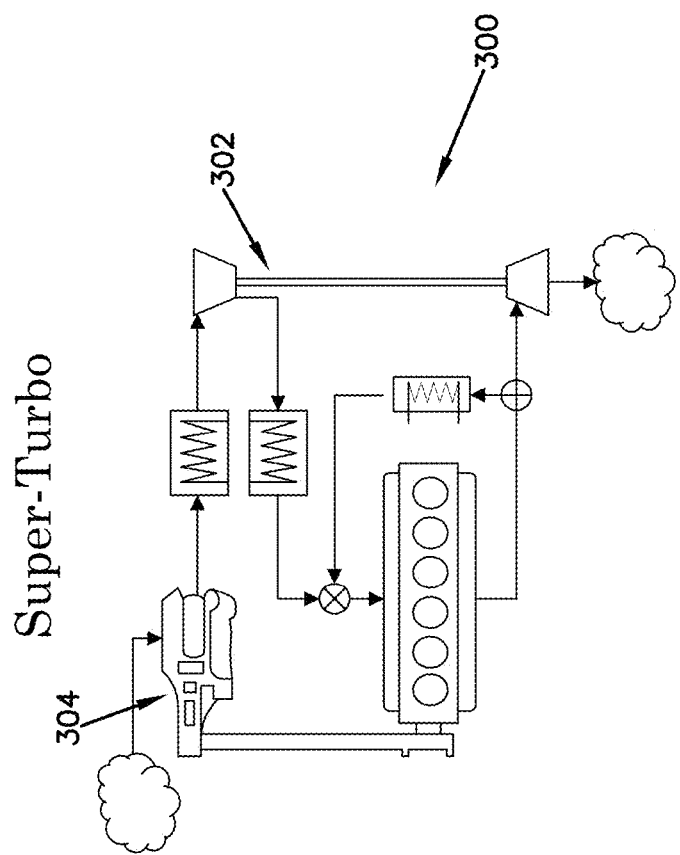
FIG. 3 is a schematic illustrating a super-turbo engine boost system having features that are examples of inventive aspects in accordance with the present disclosure.
Figure 2:
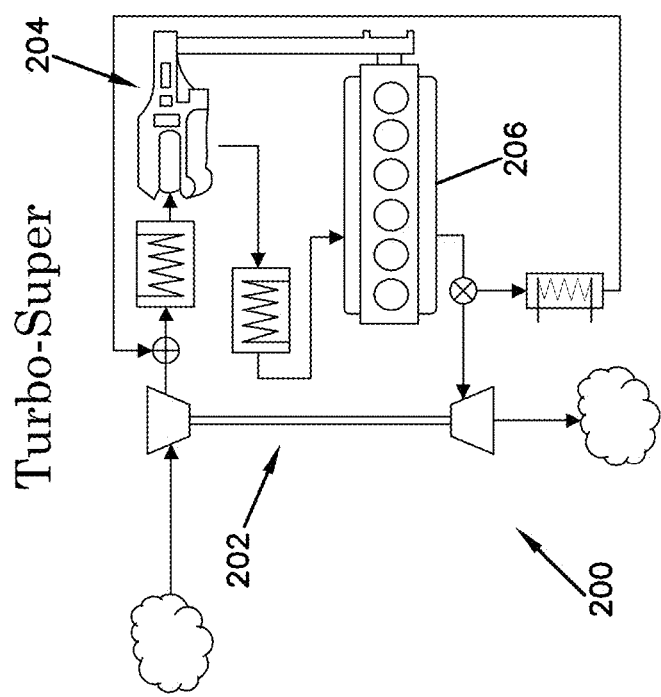
FIG. 2 is a schematic illustrating a turbo-super engine boost system having features that are examples of inventive aspects in accordance with the present disclosure.

FIGS. 2 and 3 illustrate two possible boosting system configurations that can harness the inherent complementary benefits of supercharging and turbocharging to provide high fuel efficiency with high transient engine performance.

FIG. 2 illustrates the schematic for a Turbo-Super system 200 wherein the turbocharger compressor 202 serves as the low pressure compression stage and the supercharger 204 serves as the high pressure compression stage. In such a configuration, the turbocharger 202 intakes air from the air filter at ambient conditions and then feeds the primarily charged air to the high pressure stage supercharger 204. A Turbo-Super system 200 can harness the inherent complementary benefits of supercharging and turbocharging to provide high engine performance with high fuel efficiency. For example, in such a system, the turbocharger 202 can be sized to create all of the necessary boost at high engine speeds and loads. The supercharger 204 can be selected to supplement areas where the turbocharger 202 may be deficient, which may be at low speeds and transient events. This type of a system may enable the engine 206 to satisfy or exceed all performance requirements while maintaining or improving fuel economy as compared to turbocharger-only systems such as systems 10, 100 shown in FIGS. 1A and 1B.

The system 300 shown in FIG. 3 is essentially a reversal of the system 200 of FIG. 2, in which the supercharger 304 is the low pressure stage which then feeds to the high pressure turbo compressor 302.

In the systems such as those shown in FIGS. 2 and 3, the superchargers 204, 304 of each system may be sized differently. Depending upon the layout used, the effect of having either an ambient inlet or a boosted inlet condition may define the sizing due to the mechanical supercharger being a constant volume device. In order for an engine to produce a given amount of indicated power, a certain mass air flow rate is needed. In the case of the Turbo-Super system 200, the supercharger inlet air density is increased due to the compression from the turbocharger 202 upstream. The volumetric sizing of the supercharger 204 can therefore be less than an equivalent Super-Turbo system 300 that has inlet air from ambient conditions. The Turbo-Super system 200 can have a smaller supercharger 204 and still provide the same mass flow requirements.

A Super-Turbo system 300 may provide certain advantages over a Turbo-Super system 200. For example, a Super-Turbo system 300 may eliminate interstage cooling and slightly improve transient response. The Turbo-Super system 200 may have the advantages of improved fuel economy, smaller supercharger size, and potential acoustic benefits since the turbocharger 202 decrease supercharger 204 inlet air pulsations. It should be noted that either system 200/300 is contemplated for the inventive aspects of the present disclosure and the advantages or disadvantages of one over the other should not be used to limit the scope of the present disclosure.

When using a supercharger based dual charging system, different aspects of the charging devices may be utilized for fuel economy purposes. For example, when the boosting system has two devices, there are areas where one device may operate more efficiently by itself.

A typical supercharged application has a bypass valve 400 to control intake manifold pressure. The use of a supercharger bypass valve 400 may be complemented with the use of a supercharger clutch 402 in providing fuel economy benefits for the systems 200, 300 described herein.

In a supercharger based system, a bypass pipe incorporating the bypass valve 400 may be disposed between the supercharger's inlet pipe and outlet pipe. An example supercharger bypass valve 400 is shown in the schematic layouts of FIGS. 12, 14, 15, and 16. The use of the bypass valve 400 may be coordinated with the use of a turbocharger's waste gate valve 404, an example of which is also illustrated in the Figures. A waste gate valve 404 on a turbocharger 202, 302 normally permits exhaust to move around the turbocharger turbine, instead of through it, effectively deactivating the turbocharger 202, 302 from the system.

In operation, the bypass valve 400 may be closed when the turbocharger 202, 302 is not able to provide adequate boost, for example in low speed and transient conditions, to supercharge the air coming from the turbocharger's compressor. As exhaust gas enthalpy increases with speed and load, the supercharger bypass valve 400 may be opened, and the supercharger clutch 402 disengaged to shift boost creation to the turbocharger 202, 302. Ideally, by the higher speed and load points, most, if not all, of the boost is preferably generated by the turbocharger 202, 302.

Thus, a twin charging system 200/300 may likely benefit from operating the supercharger 204, 304 in order to compensate for turbo lag when a significant increase in load, regardless of engine rpm, such as may be expected at vehicle launch, low vehicle speeds, and certain transient operating modes, is encountered. When not required, losses from supercharger pumping may be reduced by opening the air bypass of the supercharger 204, 304 so as to not further compress the air by the supercharger 204, 304. Or, when not required, losses from the supercharger 204, 304 may be further reduced by having the supercharger's drive pulley clutched such that the supercharger 204, 304 is no longer a drag on the system.

As noted above, a relationship between the disengagement of the supercharger 204, 304 and the engagement of the turbocharger 202, 302 may be established. For example, according to one example control method, the supercharger bypass valve 400 may be opened while the turbocharger waste gate valve 404 is closed. When the bypass valve 400 for the supercharger 204, 304 is opened and boost is required by the engine, the closing of the turbocharger waste gate 404 activates the turbocharger 202, 302 for providing the boost to the engine. When the turbocharger waste gate valve 404 remains closed, the benefit of the exhaust stream energy is obtained in compressing air for the engine intake.

According to other embodiments, rather than completely opening or closing the waste gate valve 404 of an FGT, if a VGT is utilized rather than an FGT, the geometry of the turbine housing of the VGT may be designed to increase the involvement of the turbocharger 202, 302 in the dual charging system.

Thus in view of the above, according to one example embodiment, a control strategy that mainly opens or closes the supercharger bypass valve 400 to control boost instead of the turbocharger waste gate 404 may be utilized. By controlling the intake manifold pressure with the supercharger bypass valve 400, the waste gate 404 on the turbocharger 202, 302 can remain closed for a greater portion of the drive cycle. This strategy allows the turbocharger 202, 302 to harness the maximum amount of available exhaust energy. The supercharger bypass valve 400 may be fully open when the supercharger boost is not needed. When the turbocharger 202, 302 cannot supply sufficient boost, such as during accelerations or low engine speeds and loads, the supercharger bypass valve 400 may be closed to build the boost until the target boost pressure is achieved. Once the target boost pressure is achieved, the supercharger bypass valve 400 is used to regulate the intake manifold pressure.

Other control strategies that relate the operation of the supercharger bypass valve 400 to the waste gate valve 404 of the turbocharger 202, 302 may be implemented for the systems 200, 300 of the present disclosure. For example, supercharger control algorithms can be designed and implemented for peak fuel economy and better transitional "handoff" to turbo 202, 302.

Since both the turbocharger 202, 302 and the supercharger 204, 304 have independent pressure control capability (e.g., bypass valve 400 for the supercharger and the waste gate valve 404 for the turbocharger or variable geometry actuation for a VGT), other control methodologies or strategies may be implemented for utilization of the characteristics of the separate devices for purposes such as thermal management of exhaust aftertreatment devices, as discussed below.

According to one example control methodology, the engine air management system can switch between two modes (1—Supercharger priority mode and 2—Turbocharger priority mode), depending upon the driving scenario.

With the Supercharger priority mode, the supercharger is used for air provision, leading to maximum indicated load and fueling and with maximum bypassing of turbocharger turbine. This mode is preferably implemented when maximum after-treatment inlet temperature is required by a DOC, DPF, or SCR system.

With the Turbocharger priority mode, the supercharger is either clutched out entirely or operated with a maximally open bypass, leading to minimum indicated load and fueling and with minimum bypassing of turbocharger turbine. This mode may be implemented when after-treatment temperature is already in optimum conversion window. This mode also can minimize fuel consumption impact of temperature management strategy.

As noted above, when boost from the supercharger 204, 304 is not needed, the supercharger bypass valve 400 may be completely open. However, there may still be losses associated with spinning the supercharger 204, 304 at little to no pressure ratio even when the bypass valve 400 is completely open. To address this, according to the present disclosure, a supercharger clutch 402, as noted above, may be employed to disengage the supercharger 204, 304 from the drive mechanism when boost from the supercharger 204, 304 is not required.

A supercharger clutch 402 can be used to disengage the supercharger 204, 304 at operating conditions when the turbocharger 202, 302 can meet all of the boosting requirements of the engine. With the supercharger 204, 304 disengaged, less engine power is required to boost the engine. Further, the supercharger bypass valve 400 may remain fully open to route the intake charge around the supercharger 204, 304. Thus, the clutch 402 may increase the engine fuel efficiency at these operating points by eliminating the input power required to drive the supercharger 204, 304, with the exception of minimal drag torque losses to drive the engine-side of the clutch 402. Conversely, the supercharger clutch 402 is engaged when boost is needed from the supercharger 204, 304. As discussed above, the supercharger 204, 304 may be needed at conditions when the exhaust enthalpy is low and the turbocharger 202, 302 cannot meet the full boost requirements of the engine, such as at low engine speeds and loads and during transient conditions.

Referring now to FIGS. 4-7, several control methods or strategies to enable engagement and disengagement of a supercharger clutch 402 while minimize the disturbance to the vehicle drivetrain and thus minimizing driver perception of the supercharger clutch actuation are described herein, the methods or strategies having features that are examples of inventive aspects in accordance with the present disclosure In dynamic load conditions, a supercharger 204, 304 can increase the performance of a diesel engine by increasing air pressure in the engine intake manifold. Disengaging the supercharger clutch 402 in non-dynamic, steady-state conditions can improve fuel economy, but the act of disengaging and later re-engaging the clutch 402 could cause undesirable drivetrain dynamics.

Figure 4:
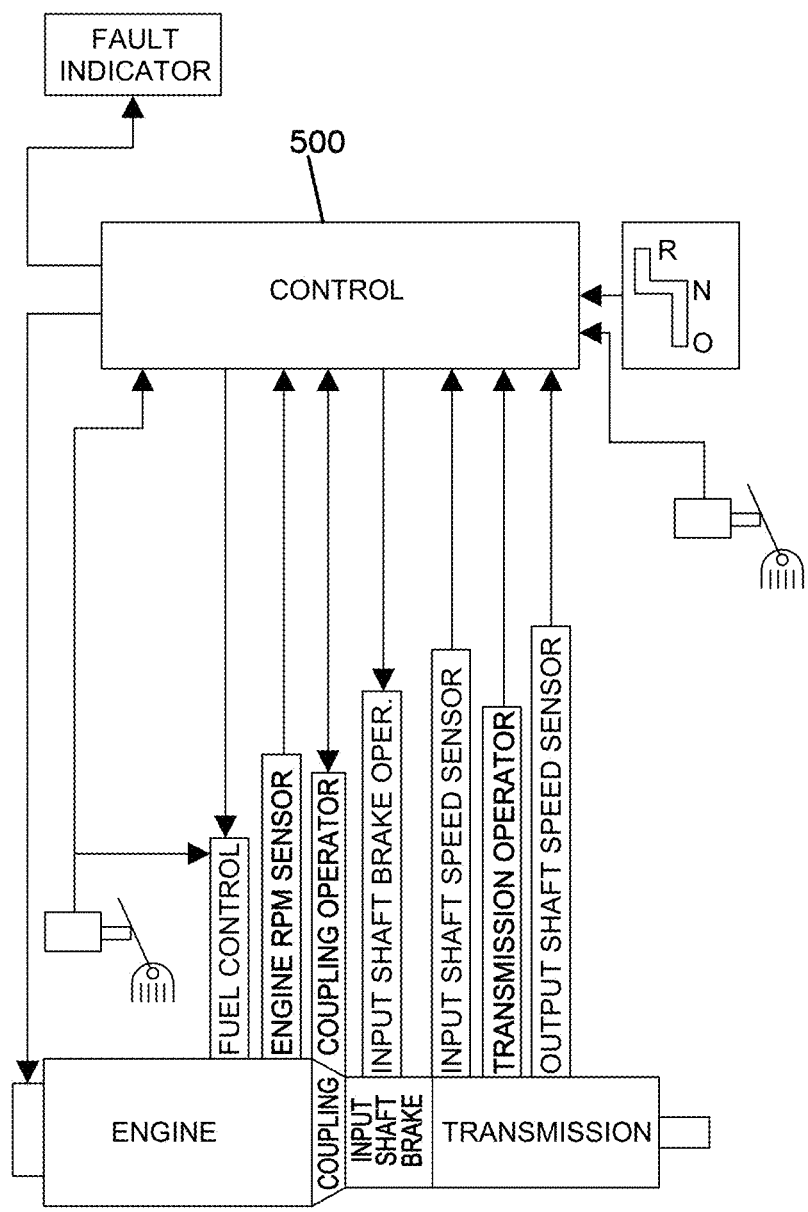
FIG. 4 is a diagram illustrating a conventional automated transmission control system for an engine.
Figure 5:
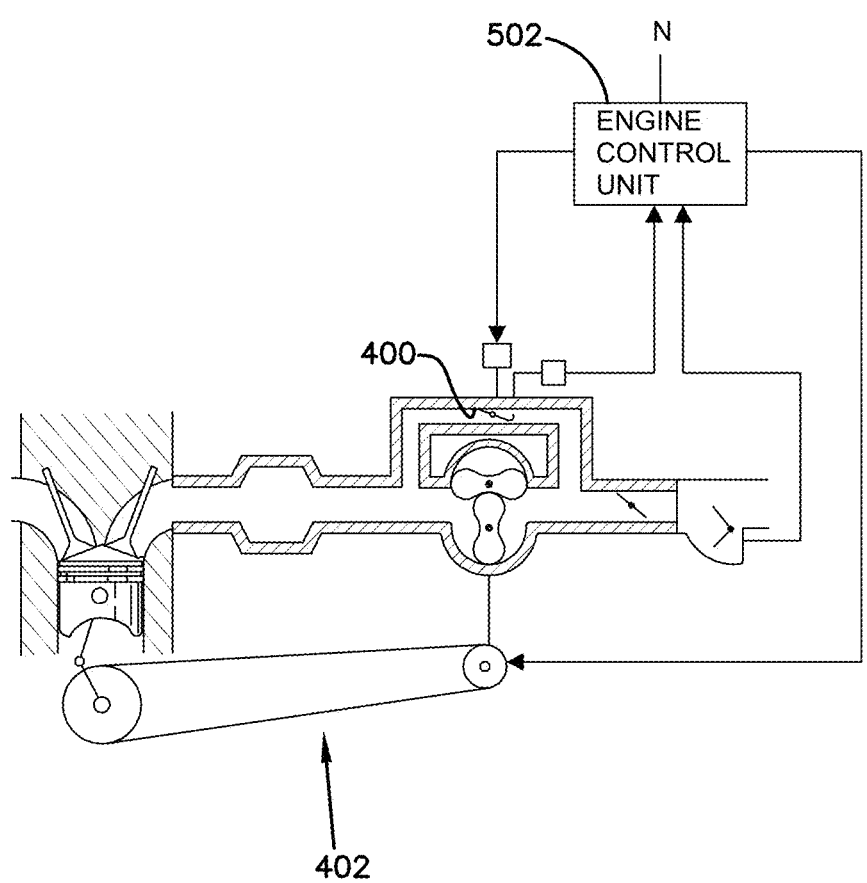
FIG. 5 is a diagram illustrating a conventional supercharger control system compatible and integratable with the engine control system of FIG. 4.

Now referring to FIG. 4, in a typical automated manual transmission application, some operating features of the engine and transmission are handled by a transmission controller 500. There are also several applications of supercharger controllers that are handled exclusively by the engine control unit (ECU) 502, an example of which is shown in FIG. 5. As will be described in further detail below, the disruption caused by supercharger clutch actuation could be further minimized by coordinating the control of the supercharger bypass, the supercharger clutch system, the fuel rate of the engine, along with the gear selection and transmission master clutch engagement events. With the proposed control strategies, if supercharger controller functionality resides within the transmission controller 500, then no information about supercharger actuation needs to be electronically communicated to the engine ECU 502.

Figure 6:
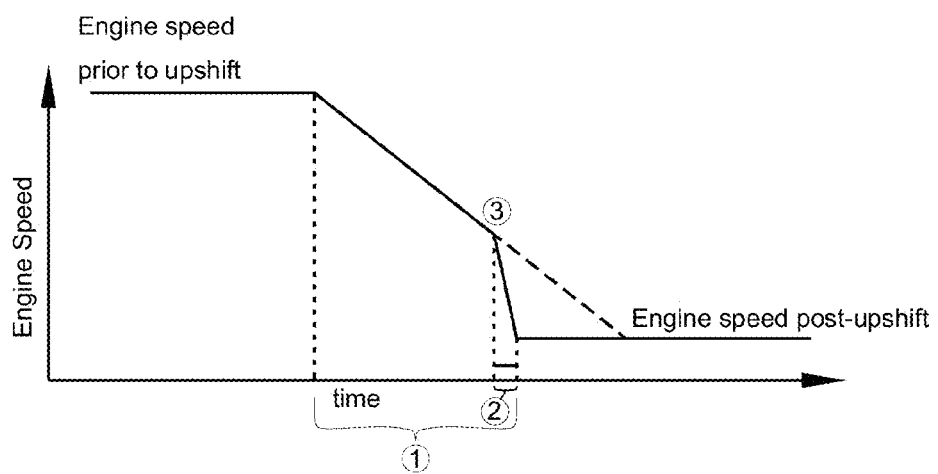
FIG. 6 is a graph illustrating one possible control method or strategy for minimizing driver perception of the actuation of a supercharger's clutch having features that are examples of inventive aspects in accordance with the present disclosure.

Referring now to FIG. 6, according to a first example control method, supercharger clutch events may be coordinated with transmission master clutch events and transmission gear shifting events (e.g., in an automated manual transmission). As such, the driver's perception of the powertrain disturbance caused by the changing clutch torque may be minimized. In this type of a control strategy, supercharger clutch engagement or disengagement events are scheduled to coincide with transmission shift events.

FIG. 6 illustrates this control strategy with an engine speed/time graph. As shown in FIG. 6, because the engine is temporarily disconnected from the drivetrain during a shift event, the torque impulse of supercharger engagement should not be noticeable to the driver. At the left of the graph in FIG. 6, engine speed is seen prior to the upshift at some relatively high level. Over the interval 1, the transmission master clutch disengages, the new gear is selected, the engine speed drifts downward, and by the end of the interval, an upshift has been completed. If the supercharger clutch was disengaged (open) prior to the engine upshift, then the clutch could be engaged while the engine speed is dropping (for instance, at 3). This would limit the torque impulse of the supercharger clutch engagement and minimize disturbance to the powertrain and to the driver. If the supercharger clutch 402 is engaged at point 3 for instance, the engine speed may be brought down much faster (over interval 2) than as previously expected (e.g., represented by dotted line). Thus, this clutch engagement strategy could also potentially have the benefit of reducing shift times.

When a supercharger clutch 402 must be engaged or disengaged and cannot coincide with a transmission shift event, then one related strategy would be to modulate the requested engine torque or supercharger bypass valve position to compensate for the change in clutch torque load. Modulating supercharger bypass commands and engine torque control requests just before and just after the clutch actuation can further reduce the driver's perception of supercharger clutch engagement or disengagement.

For example, if the supercharger clutch 402 is either engaged or disengaged when the transmission master clutch is closed, then the drivetrain will experience a disturbance. To minimize the disturbance, additional engine torque management or bypass valve management could be used either during or immediately after supercharger clutch engagement/disengagement. A control loop could be briefly activated to further reduce the transient effects associated with the engagement event. The exact details of the loop would vary from engine to engine.

Both of the control methods for the supercharger could be implemented in the transmission controller 500. As long as the engine control unit 502 was equipped with an intake manifold pressure sensor, and the fuel rate is correctly controlled according to this pressure valve, then no direct communication needs to take place between the supercharger controller subsystem and the engine ECU 502.

It should be noted that although the above control strategy has been described with respect to transmission master clutch events, in other embodiments, the supercharger clutch events may be synchronized with transmission shift events that do not necessarily involve master clutch actuation.

The control strategies discussed above can be used to enhance existing control methods that are described below.

One such existing control strategy involves forcing air through the supercharger rotors, just prior to clutch engagement. This has the potential to accelerate the rotors and reduce the delta speed across the supercharger clutch 402, thereby reducing clutch wear/heat for a given engagement/ramp-up rate. The magnitude to the impulse loading will increase as supercharger ramp-up time is decreased.

Figure 7:
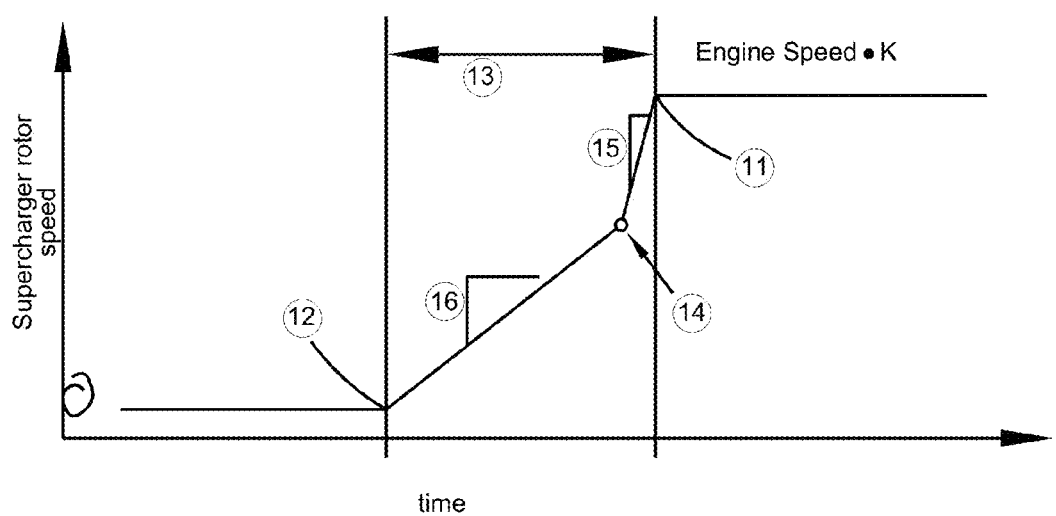
FIG. 7 is a graph illustrating another possible control method or strategy for minimizing driver perception of the actuation of a supercharger clutch having features that are examples of inventive aspects in accordance with the present disclosure.

The control strategy of actuating the supercharger bypass valve 400 to draw engine intake air through the supercharger 204, 304 to accelerate the rotors of the supercharger 204, 304, prior to clutch engagement is illustrated graphically in FIG. 7.

FIG. 7 illustrates the sequence of events that would take place in order to use the supercharger bypass valve 400 to accelerate the supercharger rotors prior to clutch engagement. Starting at t=0 in the diagram, the supercharger rotors are not rotating (rotor speed=0) with the engine at some non-zero speed, and the supercharger bypass valve 400 is fully open. In this condition, the engine would be operating without supercharger boost. If it was desired to engage the supercharger clutch at some time 11 and there was some time 13 allocated beforehand to spin up the supercharger rotors, then the following would take place: at time 12 the bypass valve would close to some fraction, causing a pressure drop across then inlet and outlet of the supercharger 204, 304. The intake manifold pressure of the engine would be slightly lower than pressure before time 12. This pressure drop would begin to cause the supercharger rotors to accelerate.

The magnitude of the pressure drop, the mass of the rotors, and other similar factors will determine the rate of acceleration 16. At some time 14, the supercharger clutch 402 is engaged, and will result in much higher acceleration rate 15 of the supercharger rotors until the clutch 402 is fully engaged at 11, and the supercharger rotors are operating at the desired speed—some factor K above engine speed, where K would be the belt pulley ratio of the engine to the supercharger 204, 304.

The benefit of the above method is that the supercharger clutch 402 is engaged at a differential speed between point 11 and point 14, rather than the larger difference between point 11 and point 12 on the graph. The resulting reduction in engagement speeds will prolong clutch life and reduce the undesired inertial loading of the drivetrain. The acceleration rate 15 could be lowered to avoid overheating the clutch 402. Since the rotors of the supercharger 204, 304 are already spinning when the clutch 402 is engaged, less power needs to be transferred (via slipping) to get the rotors to the desired speed.

Another strategy is to make the clutch 402 engage over a longer period of time to decrease perception. However, this strategy might lead to increased boost lag and clutch wear. In such a strategy, controlled slipping of the supercharger clutch 402 is allowed to lengthen the transition time between open and closed positions of the clutch 402. A variety of pulsewidth modulation (PWM) schemes could be used with an on-off clutch engagement controller in order to induce some type of clutch slippage. Whenever the clutch engagement time is lengthened, it should result in a smoother speed matching across the clutch 402 and excite fewer high frequency drivetrain dynamics.

As noted above, either of these control methods could be further enhanced through coordination with transmission master clutch shift events. Any or all of the above methods could be used to smooth the supercharger clutch actuation event.

Figure 8:
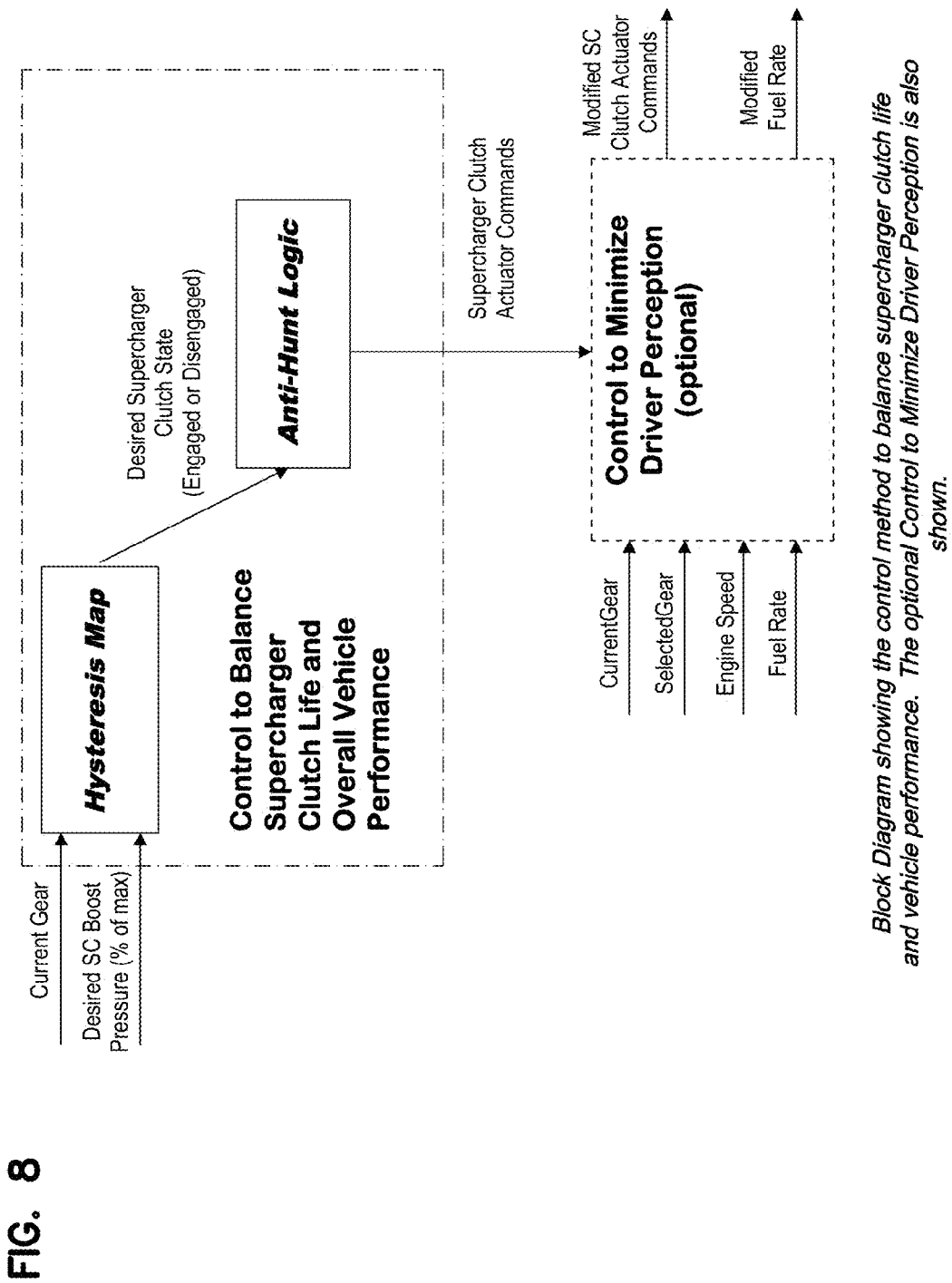
FIG. 8 is a diagram illustrating a control method or strategy for balancing supercharger clutch life and vehicle performance having features that are examples of inventive aspects in accordance with the present disclosure.
Figure 9:
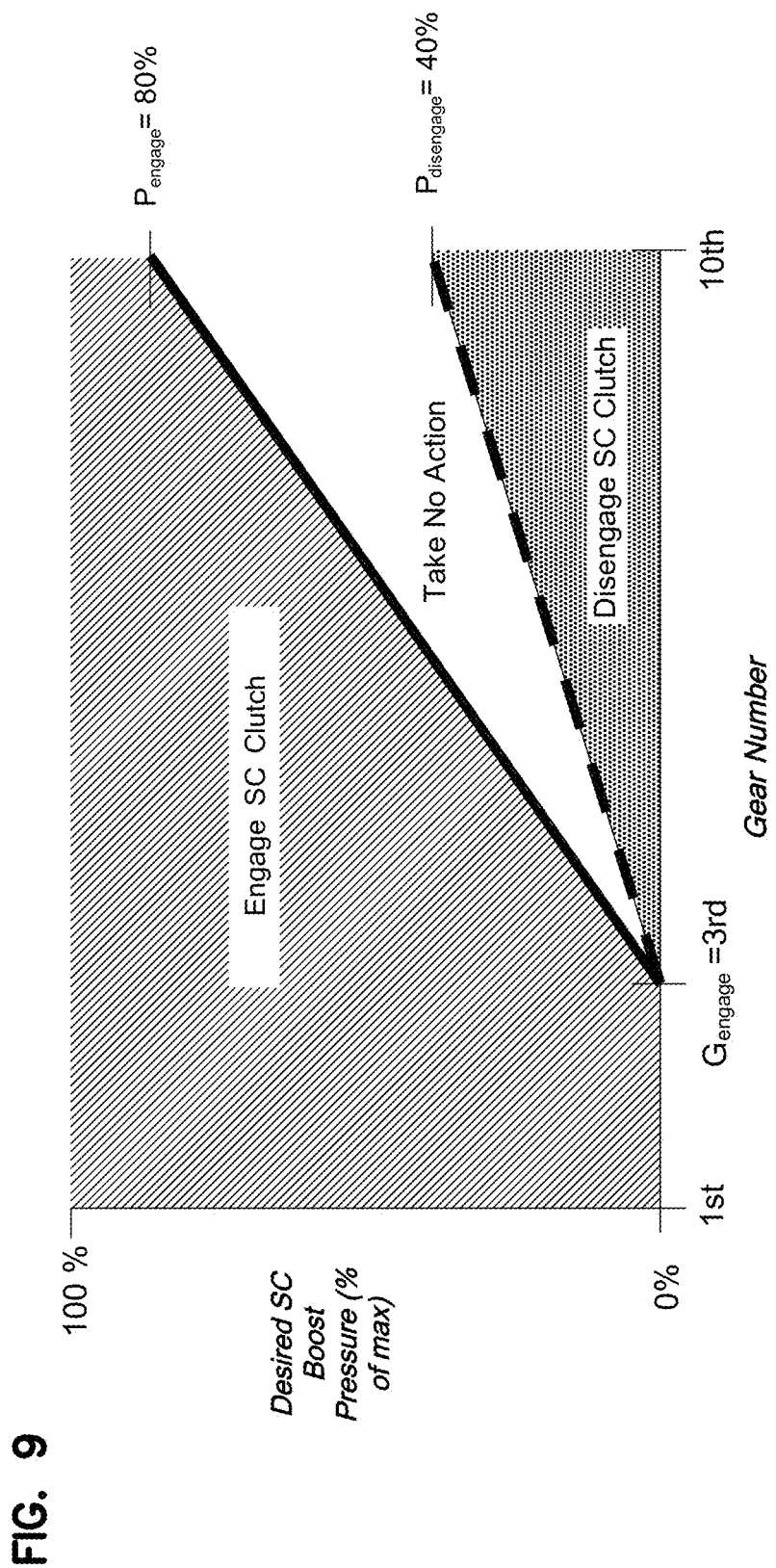
FIG. 9 illustrates a hysteresis lookup table or map for "Current Gear" and "Desired Supercharger Boost Pressure" for use with the control method or strategy illustrated in FIG. 8, wherein in FIG. 9, the engagement threshold line is the heavy solid line between $P_{engage}$ and $G_{engage}$, the disengagement threshold line is the heavy dashed line between $P_{engage}$ and $G_{engage}$ and the area between these lines is labeled "Take No Action", and represents the hysteresis band, where if the clutch was engaged before, it should be left engaged and if the clutch was disengaged before, it should be left disengaged.
Figure 10:
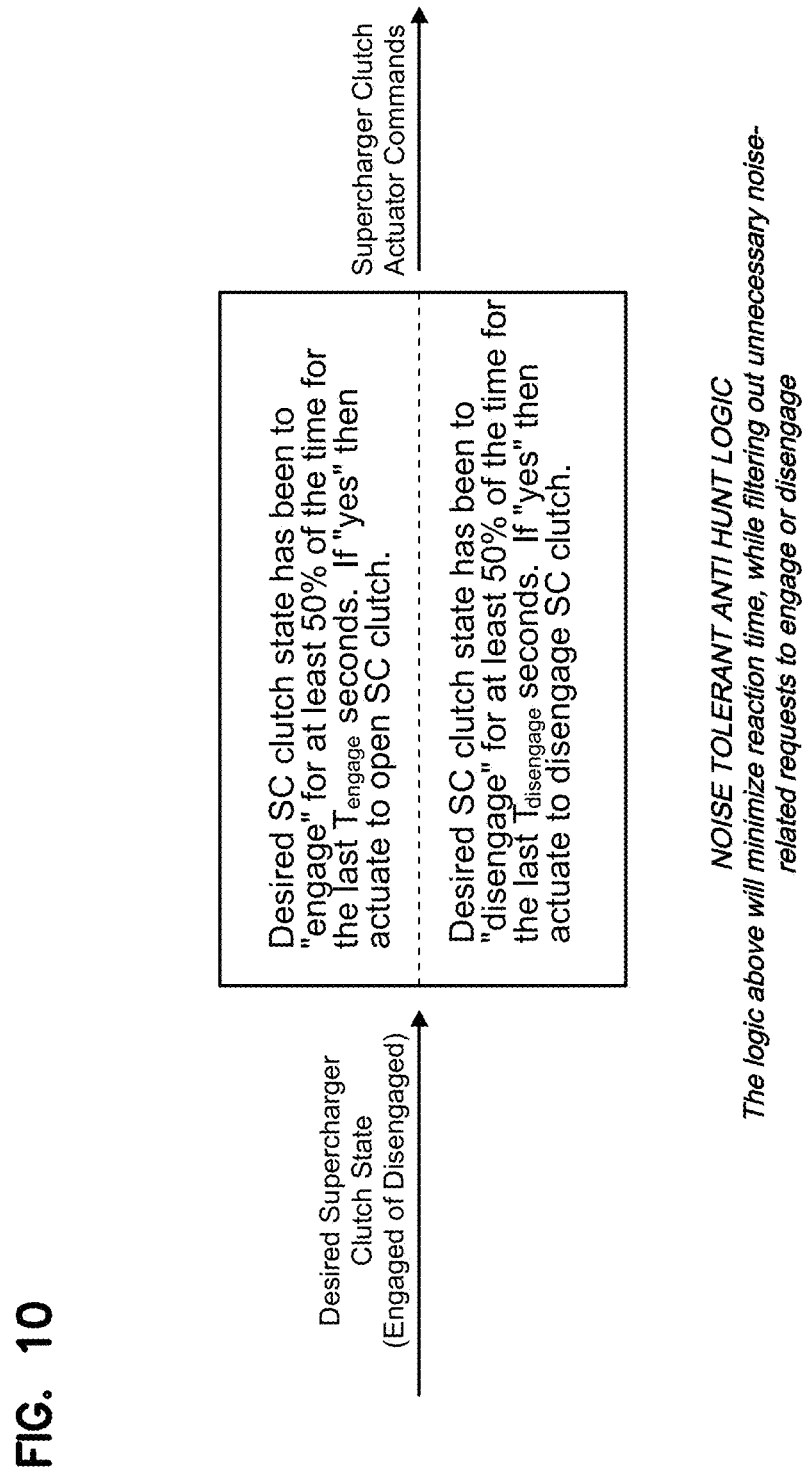
FIG. 10 illustrates a noise tolerant anti hunt logic for use with the control method or strategy illustrated in FIG. 8.

Referring now to FIGS. 8-10, a control method or strategy for balancing supercharger clutch life and overall vehicle performance is described herein. The method or strategy described below can be used on any boosting system.

Having very frequent supercharger clutch engagements and disengagements will maximize performance, but will take away from the life of the supercharger clutch 402. On the other extreme, having very infrequent supercharger clutch engagements or disengagements may lead to very long clutch life, but may hurt vehicle performance.

The proposed method provides a way to balance the two goals of clutch life and vehicle performance (i.e., vehicle fuel economy). The method of control uses hysteresis lines to limit the number of supercharger clutch actuation events, and designs the location of these lines to maximize performance. The resulting control strategy is "tunable" to any desired balance between max performance/fuel economy, and max clutch life. The proposed method can be used in conjunction with the various control methods described above that relate to minimizing driver perception of supercharger clutch actuation.

The proposed method of control relates the physical state of the vehicle (such as engine speed and gear number) to the desired physical state of the supercharger clutch 402 (engaged or disengaged).

The method of control is illustrated and described by three items: a block diagram shown in FIG. 8, a hysteresis map shown in FIG. 9, and an anti-hunt logic shown in FIG. 10.

In the method of control, there are five tunable variables: 1) $G_{engage}$=Minimum gear for clutch disengagement; 2) $P_{engage}$=Target boost pressure for clutch engagement; 3) $P_{disengage}$=Target boost pressure for clutch disengagement; 4) $T_{engage}$=Wait time for engagement; and 5) $T_{disengage}$=Wait time for disengagement.

According to one example embodiment, the typical values for these variables may be $G_{engage}$=3$^{rd}$; $P_{engage}$=80%; $P_{disengage}$=40%; $T_{engage}$=0.5 sec; and $T_{disengage}$=5 sec.

According to the control method, the design guidelines for maximizing VEHICLE PERFORMANCE, are to maximize the values of $G_{engage}$, minimize the values of $P_{engage}$, $P_{disengage}$, and $T_{engage}$, and minimize the value of $T_{disengage}$.

According to the control method, the design guidelines for maximizing CLUTCH LIFE are to minimize the values of $G_{engage}$, maximize the values of $P_{engage}$, $P_{disengage}$, and $T_{engage}$, maximize the gap between $P_{engage}$ and $P_{disengage}$, and maximize the value of $T_{disengage}$.

The block diagram in FIG. 8 shows how two signals, "Current Gear" and "Desired Supercharger Boost Pressure", are used in a hysteresis lookup table (FIG. 9). The output of the lookup table in FIG. 9 is passed into anti-hunt logic (shown in FIG. 10). The anti-hunt logic of FIG. 10 issues clutch actuator commands. If desired, these commands can be further filtered to reduce driver perception of clutch events, as noted in the previous control methods described above.

The hysteresis map of FIG. 9 can be described as follows: Using the current gear and desired SC boost pressure, one can locate the desired action on the 2-d hysteresis map. If the current gear is equal to or less than $G_{engage}$, then the desired action will be to engage the supercharger clutch 402. If the current gear is greater than $G_{engage}$, then the desired action will be dependent on the requested level of supercharger boost. If the requested level of boost is above the "engagement threshold line", then the desired state of the supercharger clutch 402 is set to "engaged". If/when the supercharger clutch 402 is actually engaged, then the desired level of boost will be supplied. If the requested level of boost is below the "disengagement threshold line", then the desired state of the supercharger clutch 402 is set to "disengaged". While the supercharger clutch 402 is waiting to disengage, the requested level of boost will be supplied. Once the supercharger clutch 402 is, in fact, disengaged, the desired level of boost will not be supplied (i.e., when the SC clutch is open, zero SC boost will be provided).

The clutch actuation request is further modified by anti-hunt logic as shown in the diagram of FIG. 10 to prevent excessive actuation of the supercharger clutch 402.

Figure 11:
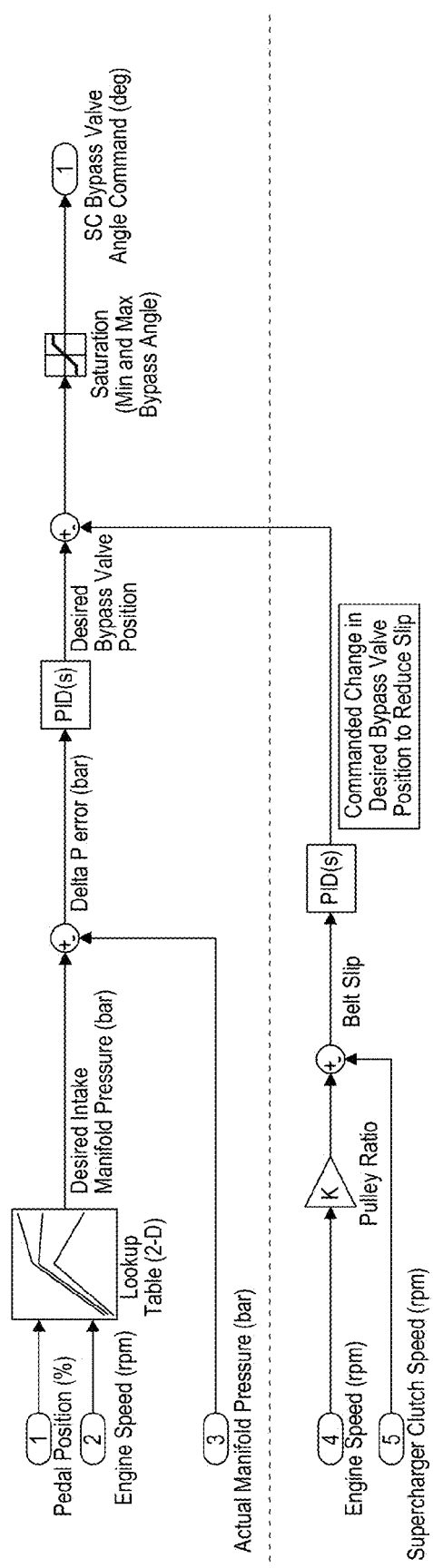
FIG. 11 is a schematic illustrating a controller for actuating the bypass valve of a supercharger to limit belt slip in a supercharger-based system having features that are examples of inventive aspects in accordance with the present disclosure.

Referring now to FIG. 11, a method of actuating the bypass valve 400 of the supercharger 204, 304 to limit supercharger belt slip is described below.

The proposed method is configured for reducing belt slip in a supercharger drive system by intelligent control of the supercharger's bypass valve 400. The proposed control method can prevent early belt breakage due to slipping.

As known, a positive displacement or roots-type supercharger 204, 304 is typically connected to an engine crankshaft by means of a pulley system. The present method of control for the supercharger bypass valve 400 can lessen the amount of belt slippage that is experienced under high load conditions.

As an extension to an existing control algorithm for a supercharger system, the control system described here uses an additional PID loop to open the bypass valve when the supercharger belt is slipping. When the bypass valve 400 is opened, it decreases the pressure at the outlet of the supercharger 204, 304 and thus the reaction torque on the supercharger belt. As a result, the amount of belt slip is decreased. The control system is shown schematically in FIG. 11, wherein the current controller is shown above the dotted line in FIG. 11 and the proposed extension to the existing control algorithm is shown below the dotted line.

According to certain embodiments, to maximize efficiency and packaging flexibility, the pulley may be preferred to be as slack as possible to limit slipping during normal operation. Otherwise, belt slippage in general can decrease life and efficiency of a supercharger 204, 304 dramatically.

The above described control systems and strategies may be used in conjunction with supercharger based systems such as the dual charged systems 200, 300 shown in FIGS. 2 and 3 and described herein. As noted above, clutch operation may be employed to disengage a supercharger 204, 304 from the drive mechanism when boost is not required from the supercharger 204, 304 since there may still be losses associated with spinning the supercharger 204, 304 at little to no pressure ratio even when the bypass valve 400 is completely open. However, as noted above, if exhaust enthalpy is low and the turbocharger 202, 302 cannot meet the full boost requirements of the engine, such as at low engine speeds and loads and during transient conditions, the supercharger clutch 400 is engaged to provide boost from the supercharger 204, 304. The above control systems and strategies can be utilized in engaging and disengaging the supercharger clutch 402.

Referring now to FIGS. 12-16, the provision of two different types of compressor devices on the intake side of the engine of the systems of the present disclosure also brings the ability to effectively utilize different Exhaust Gas Recirculation strategies for improving different aspects of the systems, as will be described in further detail below. The different EGR configurations may allow for the EGR to be drawn from either pre or post turbine locations. EGR can then be reintroduced to the fresh air side at either low, mid, or high pressure locations relative to the two compressor devices. Based on the need to cool EGR for higher mass flow capability and improved emission reduction performance, an EGR cooler may normally be needed in the EGR loops of the systems of the present disclosure.

In a high pressure loop EGR configuration 208, as illustrated in FIG. 14 for a Turbo-Super system 200, an EGR valve 210 is disposed in the exhaust system downstream of the exhaust ports 211 and parallel to the turbocharger turbine and a connection point feeds the recirculated exhaust into the supercharger outlet pipe 212 between the supercharger 204 and the engine 206. The HPL 208 may utilize an EGR cooler 214 in the path of the exhaust gas between the valve 210 and the connection to the fully pressurized air side.

In a low pressure loop EGR configuration 216, as illustrated in FIG. 15 for a Turbo-Super system 200, an EGR valve 210 is disposed in the exhaust system after the turbocharger turbine and a connection point feeds the recirculated exhaust into the turbocharger compressor inlet side 218. The LPL 216 may also be provided with an EGR cooler 214 in the path of the exhaust gas between the valve 210 and the connection to the unpressurized inlet 218 to the turbocharger compressor. In an LPL configuration 216, the exhaust gas from the turbocharger turbine may pass through a diesel particulate filter before being placed in the path of air entering the turbocharger compressor.

Figure 16:
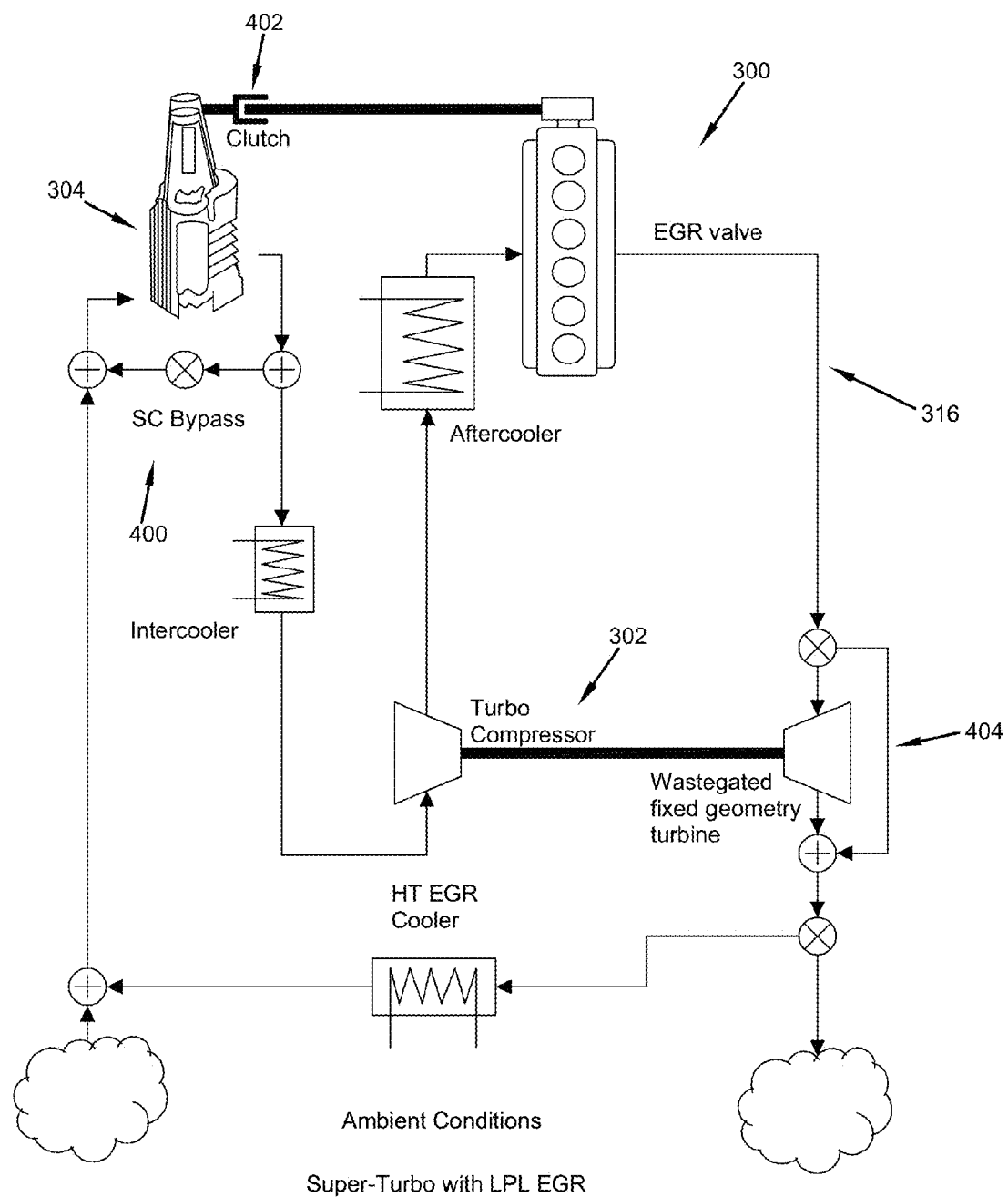
FIG. 16 is a schematic illustrating a super-turbo engine boost system having features that are examples of inventive aspects in accordance with the present disclosure, the system shown with a low pressure EGR loop.

An example of a low pressure loop EGR configuration 316 for a Super-Turbo system 300 is illustrated in FIG. 16.

Two different variations of a mid pressure EGR loop 222, 223 are illustrated in FIGS. 12 and 13 for a Turbo-Super system 200. In a mid pressure loop EGR configuration 222 for a Turbo-Super system 200, an EGR valve 210 is disposed in the exhaust system downstream of the exhaust ports 211 and parallel to the turbocharger turbine and a connection point feeds the recirculated exhaust into the supercharger inlet pipe 224 between the turbocharger compressor outlet 226 and the supercharger inlet 224. The MPL 222 may also utilize an EGR cooler 214, as shown in FIG. 12, in the path of the exhaust gas between the valve 210 and the connection to the partially pressurized air side. The MPL system 223 shown in FIG. 13 slightly varies from the MPL system 222 shown in FIG. 12 in that the EGR loop 223 includes a High Temperature (HT) EGR cooler 215 as well as a Low Temperature (LT) EGR cooler 217. The LT EGR cooler 217 may be utilized to further cool the EGR while also being able to bypass the low temperature cooler during initial engine start-up, warm-up periods, and other operating conditions in which highly cooled EGR is not desired.

The low pressure EGR loops 216 may be the most favorable from a pressure differential perspective and is most easily able to drive EGR gases but may require consideration of compressor or supercharger map capacity because of the additional mass flow requirements provided at the unpressurized intake side 218. Additionally, raw exhaust gases which have not passed through the aftertreatment system and reintroduced up stream of a turbo compressor may have issues with compressor wheel durability and longevity due to the abrasiveness of the particulate matter and potentially condensed water droplets acting on thin compressor blades. However, low pressure EGR loops 216 are still contemplated with the use of the systems 200, 300 of the present disclosure and certain disadvantages associated therewith should not be used to limit the scope of the present disclosure.

The high pressure EGR loops 208 may be more difficult from a pressure differential standpoint due to there only being a single turbine for establishing the EGR flow and two compressor devices 202/302, 204/304 on the intake side. This layout may reduce the EGR to be driven. EGR coolers used in high pressure single-turbo or twin-turbo systems are normally very large and pose a packaging concern. Same concerns would also be applicable to high pressure EGR configurations 208 in supercharger-based dual charging systems such as those shown in FIGS. 2 and 3. Additionally, in order to use low pressure post turbine EGR gases, the reduction in gas density due to the already expanded gases, even though cooled, may pose the issue of needing an even larger EGR cooler 214 to meet the mass flow requirements of an engine. However, high pressure EGR loops 208 are still contemplated with the use of the systems 200, 300 of the present disclosure and certain disadvantages associated therewith should not be used to limit the scope of the present disclosure.

The mid pressure loop or location 222/223 may provide certain advantages for a system such as those shown in FIGS. 2 and 3. As shown in the MPL EGR layout 222, 223 in FIGS. 12 and 13, by positioning the EGR flow between the two compressor devices 202/302, 204/304, raw, untreated exhaust gases only need to flow through one of the compressor devices. A supercharger 204, 304 may be more tolerant than a turbo compressor 202, 302 to handle the exhaust flow. A supercharger's rotor speeds are normally on the order of a magnitude lower than turbocharger wheel speeds, and the rotor thicknesses even near the tips may be much larger than turbo compressor wheel blades.

In the systems 200, 300 of the present disclosure, the ability to harness the inherent benefits of a turbocharger 202, 302 and also a supercharger 204, 304 and the ability to implement an effective EGR strategy due to the supercharger-based dual charger architecture brings a number of advantages over conventional single charged or twin turbocharged based systems. A number of such advantages are discussed below.

For example, with the systems such as those shown in FIGS. 2-3 and 12-16, driveline gearing may be provided to enable a vehicle having a twin-charged engine to reap the fuel economy benefits from the ability to downspeed the engine. Engine downspeeding involves running an engine at lower speeds while retaining similar performance characteristics. Frictional losses of an engine decrease as engine speed decreases. Brake thermal efficiency degrades markedly with increased engine speed.

The near instantaneous boost response afforded by a mechanically driven supercharger 204, 304 as compared to an exhaust driven turbocharger 202, 302 allows increased vehicle performance without needing to increase the rated torque output. Thus, a distinct advantage of mechanically driven superchargers 204, 304 over turbochargers 202, 302 is the ability to produce boost at low engine speeds, independent of available exhaust gas enthalpy. The supercharger's first response allows a system such as a Turbo-Super system 200 to build boost faster than a turbocharger-only based boosting system (e.g., 10, 100). The opportunity to develop higher intake manifold pressures at lower engine speeds and during transient conditions allows the engine to be downsped as peak torque is shifted to lower speeds. Engine frictional losses may decrease and engine brake thermal efficiency may increase markedly as engine speed decreases. Thus, engine downspeeding has the potential to significantly increase fuel efficiency. A supercharger-based engine has the potential to enable better air-fuel ratio control and EGR rate control during transient events, thus, making it possible to provide for more aggressive downspeeding during vehicle acceleration than is possible with turbocharger-only systems.

To downspeed an engine effectively, prompt delivery of increased low-end torque is required to timely achieve the same engine power at low engine speeds. In conventional turbocharger-only systems 10, 100, engine torque at low engine speeds, or low-end torque, is limited as a function of time due to insufficient boost pressure under transient conditions. Turbo lag becomes even more pronounced as engines using turbo-only charging systems are downsped. Therefore, turbocharged engines can only be minimally downsped due to their limited boosting capability at low engine speeds. Sufficient low-end torque, especially under transient conditions, is necessary to enable engine downspeeding. Increased manifold pressure from a supercharger 204, 304 can produce higher low-end torque via increased engine fueling. A supercharger's instantaneous boost can compensate for the turbo lag, thus being able to achieve downspeeding while meeting driver expectations for pedal response.

According to a number of different methods contemplated by the present disclosure, engine downspeeding can be implemented by changing the final drive or axle ratio, changing the transmission shift strategy, or changing the transmission gearbox ratios. According to one possible strategy, all transmission and final drive ratios can remain constant and downspeeding can be achieved through early shifting or 'short-shifting.' The availability of increased boost, and hence torque, during the transient events allows the transmissions to be short-shifted. Short-shifting involves shifting gears sooner during the engine speed sweeps during an acceleration event, resulting in a lower average engine speed over a given drive cycle. Short-shifting does not enable downspeeding in top gear, but a vehicle operating over a highly transient drive cycle does not spend much time in top gear. Fuel economy may be improved with short-shifting since engine frictional losses are lower at lower engine speeds. When engine downspeeding is implemented by changing the transmission shift strategy, the engine and transmission hardware can remain unchanged and the downspeeding may be enacted through transmission calibration alone. With this method, reduced average engine speeds can be achieved because the engine map has more usable low end torque when compared to a turbocharged only configuration which can only utilize low speed, high torque operation after considerable lag, or by lugging the engine speed down under high load.

Besides engine downspeeding, with the systems 200, 300 of the present disclosure, another advantage provided by the use of a supercharger 204, 304 in addition to a turbocharger 202, 302 may be in the area of engine braking, as described below.

With the systems such as those shown in FIGS. 2-3 and 12-16, control strategies may be implemented to provide an engine braking function that can approach engine braking performance available from effective conventional brake systems such as a Jacobs Compression Release Brake.

Engine braking is known as a method of energy absorption to slow the acceleration of a heavy-duty vehicle on downward gradients. During engine braking, the engine is motored via the powertrain from the motion of the vehicle. During engine braking, fuel is cut and the engine absorbs power by overcoming internal friction, driving accessories, and pumping air through it. Engine braking can be a desirable alternative to long-term use of the vehicle's service or foundation brakes and can increase service brake life up to three times.

A compression release brake, also known as a Jacobs Compression Release Brake, operates by modifying the exhaust valve actuation so that the engine does more work to pump air through the system. A Jacobs brake is designed to open an exhaust valve near top dead center of a compression stroke, releasing hot gases into the exhaust manifold. During such braking, fuel is cut, the engine compresses the air, and the exhaust valve is opened after compression so the compressed air does perform useful work on pistons during the expansion stroke.

Since a supercharger 204, 304 consumes power from the engine's crankshaft, during braking, the supercharger 204, 304 can provide boosted air to the cylinders, even though the air is not being used for combustion and power is required by the supercharger 204, 304 to overcome its own friction and to compress the air. Thus, the supercharger input power is a mechanical load on the engine. Also, a supercharger 204, 304 increases air charge density. Increased charge density (higher pressure, lower temperature) increases the amount of trapped air with each intake stroke. More work is required for each compression event, which increases the power absorption through the crankshaft.

Thus, as described above, if pressurized air and no fuel is supplied to all or certain selected engine cylinders, engine braking may be provided by the supercharger side of the systems 200, 300 of the present disclosure. Engaging the supercharger clutch 402 and closing the bypass valve 400 to pressurize the air may add to the torque demand on the engine and additional braking may result from the engine pistons compressing the already boosted air. In this manner, with no ignition in the cylinder, the additional force required to stroke the piston against the pre-compressed air further increases the engine braking effect.

According to certain engine braking methods of the present disclosure, an exhaust brake valve can also be used in addition to the supercharger 204, 304 of the systems 200, 300 herein. An exhaust brake valve can significantly increase engine back pressure against which the pistons must pump. An exhaust valve is a valve that is inserted into the exhaust duct and when closed, creates a restriction that the engine pumps against on the exhaust stroke. The brake valve may be held shut by the pneumatic pressure and the high exhaust pressure may act on release springs of the valve and force the valve back open, limiting exhaust pressure build-up.

Additional braking force can also be obtained by introducing EGR flow into the supercharger 204, 304. The supercharger input power is a function of pressure ratio and mass flow. The EGR valve 210 may be modulated to increase mass flow through the supercharger 204, 304, increasing the mechanical load on the engine. The EGR cooler 214 and an after-cooler can also be used to extract energy from the gas, increasing charge density, and maintaining the pumping work.

The combination of an EGR fed supercharger 204, 304 and an exhaust brake valve can approach engine braking performance available from known brake systems such as a Jacobs Compression Release Brake. A Jacobs Compression Release Brake normally causes an engine to do extra work on the compression stroke and some extra work on the expansion stroke. With a supercharger-based brake, the extra expansion work is traded for the parasitic power absorption of the supercharger 204, 304.

The turbocharger turbine 202, 302 of the present systems 200, 300 can also be used for the engine braking effort. The turbocharger turbine 202, 302 can extract significant exhaust energy and boost the engine, increasing the mass compressed in-cylinder, and therefore the amount of engine braking.

Further details relating to the use of a supercharger-based system in providing engine braking is disclosed in WO 2006/136790, filed Jun. 16, 2006 and published Dec. 28, 2006, entitled SUPERCHARGED DIESEL ENGINES, the entire disclosure of which is incorporated herein by reference.

In addition to engine downspeeding and engine braking, with the systems 200, 300 of the present disclosure, another advantage provided by the dual charging devices may be in the area of exhaust aftertreatment devices, as mentioned previously. With the systems such as those shown in FIGS. 2-3 and 12-16, improved thermal management of exhaust aftertreatment devices may be provided relative to a baseline single charging system or to a twin turbo system (e.g., a combination VGT and FGT system), as will be described below.

For example, improved passive diesel particulate filer (DPF) regeneration and quicker catalyst light-off may be provided by higher exhaust gas temperatures caused by the dual charging. Since a single turbocharger 202, 302 is used in the dual charging system 200, 300, less energy may be extracted from the exhaust gases by the single turbo 202, 302 which may allow for extended periods between aftertreatment device regenerations. A supercharger may deliver SCR aftertreatment temperature management by enabling the turbocharger to be bypassed (via the wastegate) while the supercharger provides boost, so exhaust heat goes to the SCR system rather than the turbocharger.

During certain load conditions such as at vehicle launch, low vehicle speeds, and certain transient operating modes, when a supercharger 204, 304 of the dual charging system 200, 300 is operational, the air-fuel ratios may be maintained leading to reduced smog production. During such transient load conditions, when the supercharger 204, 304 is operational, the EGR system may continue to be used, reducing the overall nitrogen oxide levels, particulate matter (PM), and hydrocarbons (HC) produced by the system.

Two main design architecture based approaches may be taken in thermal management of exhaust aftertreatment systems. According to one example approach, exhaust temperatures may be kept high enough to eliminate the use of an EGR loop and by improving the efficiency of aftertreatment devices such as selective catalytic reduction (SCR) devices, as mentioned previously. According to another approach, higher EGR rates may be used on the engine compared to lower EGR rates achievable with turbocharged engine, pushing $NO_x$ levels lower and eliminating or limiting the need for $NO_x$ aftertreatment devices such as SCR.

With the above-described dual charged systems 200, 300 of the present disclosure, the turbocharger 202, 302 can be sized for optimal efficiency and the supercharger 204, 304 can be used to make up transient and high load performance where the turbocharger boost is insufficient. The supercharger portion of the boosting system can allow the engine to be downsped for fuel efficiency gain. For the turbocharger side, the turbocharger 202, 302 can be designed for high peak efficiency without the need for a wide operating map. Again, the supercharger 204, 304 can be used to make up transient and high load performance where the turbocharger boost is insufficient and the supercharger portion of the boosting system can allow the engine to be downsped.

With the described systems, the work-split strategy can capitalize on the beneficial aspects of both types of boosting devices, providing the desired performance, emissions, and fuel efficiency.

Improved air-fuel ratios and EGR control can be enabled during transient events with the systems of the present disclosure. Typically, EGR flow is reduced during transients to allow the engine to build boost. The results of the strategies used with the systems of the present disclosure may be lower engine-out $NO_x$, PM, and HC due to higher EGR flow rates and air-fuel ratios during transient events.

Improved DPF regeneration is also possible due to higher exhaust gas temperatures, as noted above. Less energy may be extracted from the exhaust gases by a single turbo 202, 302 which may allow for extended periods between regenerations. Cold start/low exhaust temperature conditions will also have higher exhaust temperatures while the supercharger 204, 304 is providing boost, resulting in higher exhaust gas temperatures.

With the described systems, both low speed and transient performance may be improved because the supercharger input power does not depend upon exhaust gas energy as in a turbocharger. The result may be improved torque rise rate and low end torque.

The systems described herein may provide relative cost advantages over more complex systems such as twin turbo configurations (e.g., 100) that use both a VGT and an FGT. The cost of production of a supercharger-based dual charge system utilizing an FGT may be similar to that of a single VGT based system.

As noted above, a distinct characteristic of mechanically driven superchargers over turbochargers is the ability to produce boost at low engine speeds, independent of available exhaust gas energy. The opportunity to develop higher intake manifold pressures at lower engine speeds allows the engine to be downsped as peak torque is shifted to lower speeds. Downspeeding an engine carries with it several advantages, including reduced vehicle fuel consumption.

As also discussed, supercharger based systems may provide additional advantages in the form of engine braking.

Even though the systems disclosed herein have been described as being usable on vehicles (both on-road and off-road types) such as those including heavy-duty diesel engines, it should be noted that the inventive aspects are also applicable to engines that are usable on equipment such as farm and construction equipment or stationary engines such as power generation engines, etc.

The above specification, examples and data provide a description of the inventive aspects of the disclosure. Many embodiments of the disclosure can be made without departing from the spirit and scope of the inventive aspects of the disclosure.

The invention claimed is:

1. An engine boosting system including a supercharger, the engine boosting system comprising:
   a drive belt for operatively coupling the supercharger to a crankshaft of the engine for establishing a rotational relationship between at least one rotor of the supercharger and the crankshaft, wherein the drive belt is operably coupled to the at least one rotor of the supercharger via a supercharger clutch;
   a bypass valve for selectively routing air around the supercharger with limited compression when the bypass valve is open; and
   a control system configured to receive as a first input a rotational speed of the crankshaft and configured to receive as a second input a rotational speed of the supercharger clutch and further configured to perform a comparative analysis via a PID logic loop between the rotational speed of the crankshaft and the rotational speed of the supercharger clutch for sensing a relative reduction in rotational speed of the supercharger clutch by either a slippage of the drive belt or a slippage of the supercharger clutch and configured to at least partially open the bypass valve for routing air around the supercharger when the relative reduction in rotational speed of the supercharger clutch is sensed, wherein the control system is configured to receive the first input and the second input and perform a comparative analysis via the PID logic loop between the speed of the crankshaft and the speed of the supercharger clutch even when the supercharger clutch is fully engaged with and in a steady state of rotation with the crankshaft, spinning at the same rotational speed as the crankshaft.

2. An engine boosting system according to claim 1, further comprising:
 a transmission for the engine configured to selectively operably engage a driveshaft of a vehicle to the crankshaft of the engine;
 wherein the control system is further configured to time engagement and disengagement of the supercharger with the crankshaft of the engine via the supercharger clutch during a transmission shift event, wherein the transmission shift event is defined by either a transmission master clutch shift event or a transmission gear shift event.

3. An engine boosting system according to claim 1, wherein the control system is communicatively connected to an electronic control unit of a vehicle, the control system configured to execute program instructions which, when executed, cause the control system to:
 receive a current gear in use by the vehicle;
 determine a desired boost pressure of the supercharger, which is configured to provide boost for the engine of the vehicle; and
 generate an actuation signal for the supercharger clutch based at least in part on the current gear of the vehicle and the desired boost pressure of the supercharger.

4. An engine boosting system according to claim 3, wherein the control system is further configured to generate the actuation signal based upon a lookup in a supercharger clutch actuation table.

5. An engine boosting system according to claim 4, wherein the supercharger clutch actuation table includes a plurality of yes/no entries, each entry associated with a current gear of the vehicle and a range of desired boost pressures.

6. A system according to claim 1, wherein the engine boosting system is a dual compression engine boosting system that includes the supercharger and a turbocharger.

7. A system according to claim 6, wherein the supercharger is located downstream of the turbocharger in providing the dual compression engine boosting system.

8. A system according to claim 6, wherein the turbocharger is located downstream of the supercharger in providing the dual compression engine boosting system.

9. A system according to claim 6, further comprising an exhaust gas recirculation loop for directing exhaust gases from the engine to a location between the turbocharger and the supercharger of the dual compression engine boosting system.

10. A system according to claim 9, wherein the supercharger is located downstream of the turbocharger in providing the dual compression engine boosting system.

11. A system according to claim 9, wherein the turbocharger is located downstream of the supercharger in providing the dual compression engine boosting system.

12. A system according to claim 6, further comprising an exhaust gas recirculation loop for directing exhaust gases from the engine to an air intake location of either the turbocharger or the supercharger of the dual compression engine boosting system.

13. A system according to claim 12, wherein the exhaust gas recirculation loop directs exhaust gases from the engine to the air intake location of the turbocharger, wherein the supercharger is located downstream of the turbocharger in providing the dual compression engine boosting system.

14. A system according to claim 12, wherein the exhaust gas recirculation loop directs exhaust gases from the engine to the air intake location of the supercharger, wherein the turbocharger is located downstream of the supercharger in providing the dual compression engine boosting system.

15. A system according to claim 6, further comprising an exhaust gas recirculation loop for directing exhaust gases from the engine to an air outlet location of either the turbocharger or the supercharger of the dual compression engine boosting system.

16. A system according to claim 15, wherein the exhaust gas recirculation loop directs exhaust gases from the engine to the air outlet location of the turbocharger, wherein the turbocharger is located downstream of the supercharger in providing the dual compression engine boosting system.

17. A system according to claim 15, wherein the exhaust gas recirculation loop directs exhaust gases from the engine to the air outlet location of the supercharger, wherein the supercharger is located downstream of the turbocharger in providing the dual compression engine boosting system.

18. A control system communicatively connected to an electronic control unit of a vehicle, the control system configured to execute program instructions which, when executed, cause the control system to:
 receive as a first input a rotational speed of a crankshaft of an engine of the vehicle and configured to receive as a second input a rotational speed of a supercharger clutch and further configured to perform a comparative analysis via a PID logic loop between the rotational speed of the crankshaft of the engine of the vehicle and the rotational speed of the supercharger clutch for sensing a relative reduction in rotational speed of the supercharger clutch by either a slippage of a drive belt or a slippage of the supercharger clutch and configured to at least partially open a bypass valve for routing air around a supercharger of the vehicle when a relative reduction in rotational speed of the supercharger clutch is sensed, wherein the drive belt is configured to operatively couple the supercharger to the crankshaft of the engine for establishing a rotational relationship between the at least one rotor of the supercharger and the crankshaft, wherein the drive belt is operably coupled to the at least one rotor of the supercharger via the supercharger clutch, and wherein the bypass valve is configured to route air around the supercharger with limited compression when the bypass valve is in an open configuration, wherein the control system is configured to receive the first input and the second input and perform a comparative analysis via the PID logic loop between the speed of the crankshaft and the speed of the supercharger clutch even when the supercharger clutch is fully engaged with and in a steady state of rotation with the crankshaft, spinning at the same rotational speed as the crankshaft.

19. A control system according to claim 18, wherein the control system is also configured to execute program instructions, which, when executed, cause the control system to:
receive a current gear in use by the vehicle;
determine a desired boost pressure of the supercharger, which is configured to provide boost for the engine of the vehicle; and
generate an actuation signal for the supercharger clutch based at least in part on the current gear of the vehicle and the desired boost pressure of the supercharger.

20. A control system according to claim 19, wherein the control system is further configured to generate the actuation signal based upon a lookup in a supercharger clutch actuation table.

21. A control system according to claim 20, wherein the supercharger clutch actuation table includes a plurality of yes/no entries, each entry associated with a current gear of the vehicle and a range of desired boost pressures.

22. A control system according to claim 18, wherein the vehicle further includes a transmission for the engine configured to selectively operably engage a driveshaft of the vehicle to the crankshaft of the engine, wherein the control system is further configured to time engagement and disengagement of the supercharger with the crankshaft of the engine during a transmission shift event, and wherein the transmission shift event is defined by either a transmission master clutch shift event or a transmission gear shift event.

23. A control system according to claim 22, wherein the control system is configured to engage and disengage the supercharger with the crankshaft of the engine by the actuation of the supercharger clutch.

24. An engine boosting system including a supercharger, the engine boosting system comprising:
a transmission for the engine configured to selectively operably engage a driveshaft of a vehicle to the crankshaft of the engine;
a drive belt for operatively coupling the supercharger to the crankshaft of the engine for establishing a rotational relationship between at least one rotor of the supercharger and the crankshaft;
a supercharger clutch for operably engaging or disengaging the drive belt that operably couples the supercharger to the crankshaft of the engine of the vehicle;
a bypass valve for selectively routing air around the supercharger with limited compression when the bypass valve is open; and
a control system configured to receive as a first input a rotational speed of the crankshaft and configured to receive as a second input a rotational speed of the supercharger clutch and further configured to perform a comparative analysis via a PID logic loop between the rotational speed of the crankshaft and the rotational speed of the supercharger clutch for sensing a relative reduction in rotational speed of the supercharger clutch by either a slippage of the drive belt or a slippage of the supercharger clutch and configured to at least partially open the bypass valve for routing air around the supercharger when the relative reduction in rotational speed of the supercharger clutch is sensed, wherein the control system is further configured to time engagement and disengagement of the supercharger with the crankshaft of the engine via the supercharger clutch during a transmission shift event, wherein the transmission shift event is defined by either a transmission master clutch shift event or a transmission gear shift event, and wherein the control system is also configured to generate an actuation signal for the supercharger clutch based at least in part on a current gear of the vehicle and a desired boost pressure of the supercharger that is configured to provide boost for the engine of the vehicle, wherein the control system is further configured to receive the first input and the second input and perform a comparative analysis via the PID logic loop between the speed of the crankshaft and the speed of the supercharger clutch even when the supercharger clutch is fully engaged with and in a steady state of rotation with the crankshaft, spinning at the same rotational speed as the crankshaft.

25. A system according to claim 24, wherein the engine boosting system is a dual compression engine boosting system that includes the supercharger and a turbocharger.

26. A system according to claim 25, wherein the supercharger is located downstream of the turbocharger in providing the dual compression engine boosting system.

27. A system according to claim 25, wherein the turbocharger is located downstream of the supercharger in providing the dual compression engine boosting system.

* * * * *